United States Patent
Degol et al.

(10) Patent No.: US 12,154,312 B2
(45) Date of Patent: Nov. 26, 2024

(54) PIXEL CORRESPONDENCE VIA PATCH-BASED NEIGHBORHOOD CONSENSUS

(71) Applicant: Microsoft Technology Licensing, LLC, Redmond, WA (US)

(72) Inventors: Joseph Michael Degol, Seattle, WA (US); Jae Yong Lee, Urbana, IL (US); Sudipta Narayan Sinha, Kirkland, WA (US); Victor Manuel Fragoso Rojas, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 237 days.

(21) Appl. No.: 17/191,516

(22) Filed: Mar. 3, 2021

(65) Prior Publication Data
US 2022/0284233 A1 Sep. 8, 2022

(51) Int. Cl.
*G06K 9/62* (2022.01)
*G06F 18/214* (2023.01)
(Continued)

(52) U.S. Cl.
CPC .......... *G06V 10/758* (2022.01); *G06F 18/214* (2023.01); *G06N 3/084* (2013.01); *G06V 10/464* (2022.01); *G06V 10/751* (2022.01)

(58) Field of Classification Search
CPC .... G06K 9/6256; G06N 3/084; G06V 10/464; G06V 10/751; G06V 10/758;
(Continued)

(56) References Cited

U.S. PATENT DOCUMENTS

| 2009/0003430 A1* | 1/2009 | Sun | ........................ G06T 7/40 |
| | | | 375/240.01 |
| 2009/0123089 A1* | 5/2009 | Karlov | ................ H04N 19/156 |
| | | | 382/300 |

(Continued)

OTHER PUBLICATIONS

Di Rocco I, Cimpoim, Arandjelovic R, Torii A, Pajdla T, Sivic J: "Neighbourhood consensus networks", Advances in Neural Information Processing Systems, 2018, pp. 1651-1662 (Year: 2018).*

(Continued)

*Primary Examiner* — Michael J Vanchy, Jr.
(74) *Attorney, Agent, or Firm* — Alleman Hall & Tuttle LLP

(57) ABSTRACT

One example provides a computing system comprising a storage machine storing instructions executable by a logic machine to extract features from a source and target images to form source and target feature maps, form a correlation map comprising a plurality of similarity scores, form an initial correspondence map comprising initial mappings between pixels of the source feature map and corresponding pixels of the target feature map, refine the initial correspondence map by, for each of one or more pixels of the source feature map, for each of a plurality of candidate correspondences, inputting a four-dimensional patch into a trained scoring function, the trained scoring function being configured to output a correctness score, and selecting a refined correspondence based at least upon the correctness scores, and output a refined correspondence map comprising a refined correspondence for each of the one or more pixels of the source feature map.

7 Claims, 11 Drawing Sheets

(51) Int. Cl.
  *G06K 9/46* (2006.01)
  *G06N 3/08* (2023.01)
  *G06N 3/084* (2023.01)
  *G06V 10/46* (2022.01)
  *G06V 10/75* (2022.01)

(58) Field of Classification Search
  CPC .... G06V 10/761; G06V 10/778; G06V 10/82; G06V 20/70
  See application file for complete search history.

(56) References Cited

U.S. PATENT DOCUMENTS

| | | | | |
|---|---|---|---|---|
| 2013/0051685 | A1* | 2/2013 | Shechtman | G06T 11/60 382/218 |
| 2016/0328861 | A1* | 11/2016 | Shavit | G06T 19/20 |
| 2018/0101942 | A1* | 4/2018 | Carr | G06V 10/7557 |
| 2021/0142463 | A1* | 5/2021 | Amirghodsi | G06T 7/337 |
| 2022/0027728 | A1* | 1/2022 | Han | G06V 10/764 |

OTHER PUBLICATIONS

Barnes, et al., "The Generalized PatchMatch Correspondence Algorithm", In Proceedings of the 11th European Conference on Computer Vision Conference on Computer Vision: Part III, Sep. 5, 2010, pp. 1-14. (Year: 2010).*

DiRocco¹,Cimpoim,Arandjelovicr,Toriia,Pajdlat,SIVICJ:"Neighbourhood consensus networks", Advancesinneuralinformationprocessingsystems,2018,pp. 1651-1662 (Year: 2018).*

Agarwal, et al., "Building Rome in a Day", In Journal of Communications of the ACM, vol. 54, Issue 10, Oct. 2011, pp. 105-112.

Bansal, et al., "Shapes and Context: In-the-Wild Image Synthesis and Manipulation", In Proceedings of the IEEE/CVF Conference on Computer Vision and Pattern Recognition, Jun. 16, 2019, pp. 2317-2326.

Barnes, et al., "The Generalized PatchMatch Correspondence Algorithm", In Proceedings of the 11th European Conference on Computer Vision Conference on Computer Vision: Part III, Sep. 5, 2010, pp. 1-14.

Bay, et al., "Speeded-Up Robust Features (SURF)", In Journal of Computer Vision and Image Understanding, vol. 110, Issue 3, Jun. 2008, pp. 346-359.

Bian, et al., "GMS: Grid-based Motion Statistics for Fast, Ultra-robust Feature Correspondence", In Proceedings of IEEE Conference on Computer Vision and Pattern Recognition, Jul. 21, 2017, pp. 2828-2837.

Bleyer, et al., "PatchMatch Stereo—Stereo Matching with Slanted Support Windows", In Proceedings of British Machine Vision Conference, vol. 11, Sep. 2, 2011, pp. 1-11.

Chen, et al., "Stereoscopic Neural Style Transfer", In Proceedings of the IEEE Conference on Computer Vision and Pattern Recognition, Jun. 18, 2018, pp. 6654-6663.

Cho, et al., "Learning Graphs to Match", In Proceedings of the IEEE International Conference on Computer Vision, Dec. 1, 2013, 8 Pages.

Cho, et al., "Reweighted Random Walks for Graph Matching", In European Conference on Computer Vision, Sep. 5, 2010, pp. 492-505.

Dalal, et al., "Histograms of Oriented Gradients for Human Detection", In Proceedings of IEEE Computer Society Conference on Computer Vision and Pattern Recognition, Jun. 20, 2005, 8 Pages.

Darabi, et al., "Image Melding: Combining Inconsistent Images using Patch-based Synthesis", In Proceedings of ACM Transactions on Graphics (TOG), vol. 31, Issue 4, Jul. 2012, 10 Pages.

Degol, et al., "Improved Structure from Motion Using Fiducial Marker Matching", In Proceedings of the European Conference on Computer Vision, Oct. 7, 2018, pp. 1-16.

Detone, et al., "SuperPoint: Self-Supervised Interest Point Detection and Description", In Proceedings of the IEEE Conference on Computer Vision and Pattern Recognition Workshops, Jun. 18, 2018, pp. 337-349.

Duggal, et al., "DeepPruner: Learning Efficient Stereo Matching via Differentiable PatchMatch", In Proceedings of the IEEE/CVF International Conference on Computer Vision, Oct. 27, 2019, pp. 4384-4393.

Dusmanu, et al., "D2-net: A Trainable CNN for Joint Description and Detection of Local Features", In Proceedings of the IEEE Conference on Computer Vision and Pattern Recognition, 2019, pp. 8092-8101.

Everingham, et al., "The PASCAL Visual Object Classes (VOC) Challenge", In International Journal of Computer Vision, vol. 88, Issue 2, Jun. 2010, pp. 303-338.

Fischler, et al., "Random Sample Consensus: A Paradigm for Model Fitting with Applications to Image Analysis and Automated Cartography", In Journal of Communications of the ACM Magazine, vol. 24, Issue 6, Jun. 1981, pp. 381-395.

Fragoso, et al., "EVSAC: Accelerating Hypotheses Generation by Modeling Matching Scores with Extreme Value Theory", In Proceedings of the IEEE International Conference on Computer Vision, Dec. 1, 2013, pp. 2472-2479.

Galliani, et al., "Massively Parallel Multiview Stereopsis by Surface Normal Diffusion", In the IEEE International Conference on Computer Vision (ICCV), Jun. 2015, pp. 873-881.

Hacohen, et al., "Non-Rigid Dense Correspondence with Applications for Image Enhancement", In Journal of ACM Transactions on Graphics, vol. 30, Issue 4, Jul. 1, 2011, 9 Pages.

Ham, et al., "Proposal Flow: Semantic Correspondence from Object Proposals", In Proceedings of the IEEE Conference on Computer Vision and Pattern Recognition, Jul. 11, 2017, pp. 1-15.

Han, et al., "SCNet: Learning Semantic Correspondence", In Proceedings of the IEEE International Conference on Computer Vision, Oct. 22, 2017, pp. 1831-1840.

He, et al., "Deep Residual Learning for Image Recognition", In Proceedings of the IEEE Conference on Computer Vision and Pattern Recognition, Jun. 27, 2016, pp. 770-778.

Iu, et al., "Efficient Coarse-to-Fine PatchMatch for Large Displacement Optical Flow", In Proceedings of the IEEE Conference on Computer Vision and Pattern Recognition, Jun. 26, 2016, pp. 5704-5712.

Hur, et al., "Generalized Deformable Spatial Pyramid: Geometry-Preserving Dense Correspondence Estimation", In Proceedings of the IEEE Conference on Computer Vision and Pattern Recognition, Jun. 7, 2015, pp. 1392-1400.

Jeon, et al., "Guided Semantic Flow", In European Conference on Computer Vision, Aug. 23, 2020, pp. 1-17.

Kim, et al., "DCTM: Discrete-Continuous Transformation Matching for Semantic Flow", In Proceedings of the IEEE International Conference on Computer Vision, Oct. 2017, pp. 4529-4538.

Kim, et al., "Deformable Spatial Pyramid Matching for Fast Dense Correspondences", In Proceedings of the IEEE Conference on Computer Vision and Pattern Recognition, Jun. 23, 2013, pp. 1-8.

Kim, et al., "FCSS: Fully Convolutional Self-Similarity for Dense Semantic Correspondence", In Proceedings of the EEE Conference on Computer Vision and Pattern Recognition, Jul. 21, 2017, pp. 616-625.

Korman, et al., "Coherency Sensitive Hashing", In Proceedings of IEEE Transactions on Pattern Analysis and Machine Intelligence, vol. 38, Issue 6, Sep. 10, 2015, 8 Pages.

Krizhevsky, et al., "ImageNet Classification with Deep Convolutional Neural Networks", In Journal of Communications of the ACM, vol. 60, Issue 6, Jun. 2017, pp. 84-90.

Lee, et al., "SFNet: Learning Object-aware Semantic Correspondence", In Proceedings of the IEEE Conference on Computer Vision and Pattern Recognition, Jun. 15, 2019, pp. 2278-2287.

Li, et al., "Correspondence Networks with Adaptive Neighbourhood Consensus", In Proceedings of the IEEE/CVF Conference on Computer Vision and Pattern Recognition, Jun. 13, 2020, pp. 10196-10205.

Lin, et al., "Bilateral Functions for Global Motion Modeling", In European Conference on Computer Vision, Sep. 6, 2014, pp. 1-16.

(56) References Cited

OTHER PUBLICATIONS

Liu, et al., "Semantic Correspondence as an Optimal Transport Problem", In Proceedings of the IEEE/CVF Conference on Computer Vision and Pattern Recognition, Jun. 13, 2020, pp. 4463-4472.
Liu, et al., "SIFT Flow: Dense Correspondence across Scenes and its Applications", In Journal of IEEE Transactions on Pattern Analysis and Machine Intelligence, vol. 33, Issue 5, May 2011, pp. 978-994.
Long, et al., "Do Convnets Learn Correspondence?", In Journal of Advances in Neural Information Processing Systems, Dec. 8, 2014, pp. 1-9.
Lowe, David G., "Object Recognition from Local Scale-Invariant Features", In Proceedings of 7th IEEE International Conference on Computer Vision, Sep. 20, 1999, 8 Pages.
Lu, et al., "PatchMatch Filter: Efficient Edge-Aware Filtering Meets Randomized Search for Fast Correspondence Field Estimation", In Proceedings of the IEEE Conference on Computer Vision and Pattern Recognition, Jun. 23, 2013, pp. 1854-1861.
Min, et al., "Hyperpixel Flow: Semantic Correspondence with Multi-layer Neural Features", In Proceedings of the IEEE International Conference on Computer Vision, Oct. 27, 2019, pp. 3395-3404.
Ono, et al., "LF-Net: Learning Local Features from Images", In Advances in Neural Information Processing Systems, Dec. 3, 2018, pp. 1-11.
Pollefeys, et al., "Detailed Real-Time Urban 3D Reconstruction from Video", In International Journal of Computer Vision, vol. 78, No. 2-3, Jul. 2008, pp. 1-43.
Revaud, et al., "DeepMatching: Hierarchical Deformable Dense Matching", In International Journal of Computer Vision, vol. 120, Issue 3, Apr. 29, 2016, pp. 300-323.
Revaud, et al., "R2D2: Repeatable and Reliable Detector and Descriptor", In Proceedings of 33rd Conference on Neural Information Processing Systems, Dec. 8, 2019, pp. 1-11.
Rocco, et al., "Convolutional neural network architecture for geometric matching", In Proceedings of the IEEE conference on computer vision and pattern recognition, Jul. 21, 2017, pp. 6148-6157.
Rocco, et al., "Efficient Neighbourhood Consensus Networks via Submanifold Sparse Convolutions", In European Conference on Computer Vision, Mar. 5, 2020, pp. 1-17.
Rocco, et al., "End-to-end weakly-supervised semantic alignment", In Proceedings of the IEEE Conference on Computer Vision and Pattern Recognition, Jun. 18, 2018, pp. 6917-6925.
Rocco, et al., "Neighbourhood Consensus Networks", In Advances in Neural Information Processing Systems, Dec. 3, 2018, pp. 1-12.
Schmid, et al., "Local Grayvalue Invariants for Image Retrieval", In Journal of IEEE Transactions on Pattern Analysis And Machine Intelligence, vol. 19, No. 5, May 1997, pp. 530-535.
Schonberger, et al., "Structure-from-Motion Revisited", In Proceedings of the IEEE Conference on Computer Vision and Pattern Recognition, Jun. 2016, pp. 4104-4113.
"International Search Report and Written opinion Issued in PCT Application No. PCT/US22/017411", Mailed Date: May 30, 2022, 10 Pages.
Sen, et al., "Robust Patch-Based HDR Reconstruction of Dynamic Scenes," In ACM Transactions on Graphics, vol. 31, Issue 6, Nov. 2012, 12 pages.
Seo, et al., "Attentive Semantic Alignment with Offset-Aware Correlation Kernels", In Proceedings of European Conference on Computer Vision, Sep. 8, 2018, pp. 1-21.
Taniai, et al., "Joint Recovery of Dense Correspondence and Cosegmentation in Two Images", In Proceedings of the IEEE Conference on Computer Vision and Pattern Recognition, Jun. 27, 2016, pp. 4246-4255.
Tau, et al., "Dense Correspondences across Scenes and Scales", In Journal of IEEE Transactions on Pattern Analysis and Machine Intelligence, vol. 38, Issue 5, 2016, pp. 1-14.
Teed, et al., "RAFT: Recurrent All-Pairs Field Transforms for Optical Flow", In Repository of arXiv:2003.12039v3, Aug. 25, 2020, pp. 1-21.
Tulsiani, et al., "Viewpoints and Keypoints", In Proceedings of the IEEE Conference on Computer Vision and Pattern Recognition, Jun. 7, 2015, pp. 1510-1519.
Ufer, et al., "Deep Semantic Feature Matching", In Proceedings of the IEEE Conference on Computer Vision and Pattern Recognition, Jul. 21, 2017, pp. 5929-5938.
Xu, et al., "Motion Detail Preserving Optical Flow Estimation", In Journal of IEEE Transactions on Pattern Analysis and Machine Intelligence, vol. 34, Issue 9, Sep. 2012, pp. 1744-1757.
Yang, et al., "Articulated Human Detection with Flexible Mixtures of Parts", In IEEE Transactions on Pattern Analysis and Machine Intelligence, vol. 35, Issue 12, Dec. 2013, pp. 2878-2890.
Zhang, et al., "A robust technique for matching two uncalibrated images through the recovery of the unknown epipolar geometry", In Journal of Artificial Intelligence, vol. 78, Issues 1-2, Oct. 1995, pp. 87-119.

* cited by examiner

| Architecture Pretrained | aero | bike | bird | boat | bottle | bus | car | cat | chair | cow | dog | horse | moto | person | plant | sheep | train | tv | all |
|---|---|---|---|---|---|---|---|---|---|---|---|---|---|---|---|---|---|---|---|
| CNNGeo [1] | 21.3 | 15.1 | 34.6 | 12.8 | 31.2 | 26.3 | 24.0 | 30.6 | 11.6 | 24.3 | 20.4 | 12.2 | 19.7 | 15.6 | 14.3 | 9.6 | 28.5 | 28.8 | 18.1 |
| A2Net [2] | 20.8 | 17.1 | 37.4 | 13.9 | 33.6 | 29.4 | 26.5 | 34.9 | 12.0 | 26.5 | 22.5 | 13.3 | 21.3 | 20.0 | 16.9 | 11.5 | 28.9 | 31.6 | 20.1 |
| WeakAlign [3] | 23.4 | 17.0 | 41.6 | 14.6 | 37.6 | 28.1 | 26.6 | 32.6 | 12.6 | 27.9 | 23.0 | 13.6 | 21.3 | 22.2 | 17.9 | 10.9 | 31.5 | 34.8 | 21.1 |
| NC-Net [4] | 24.0 | 16.0 | 45.0 | 13.7 | 35.7 | 25.9 | 19.0 | 50.4 | 14.3 | 32.6 | 27.4 | 19.2 | 21.7 | 20.3 | 20.4 | 13.6 | 33.6 | 40.4 | 26.4 |
| ANC-Net [5] | - | - | - | - | - | - | - | - | - | - | - | - | - | - | - | - | - | - | 28.7 |
| GSF [6] | - | - | - | - | - | - | - | - | - | - | - | - | - | - | - | - | - | - | 33.5 |
| PMNCbest | 24.6 | 19.3 | 57.3 | 16.9 | 37.0 | 21.4 | 14.7 | 54.3 | 17.4 | 37.6 | 37.0 | 25.4 | 18.7 | 28.2 | 21.0 | 19.1 | 29.9 | 32.6 | 28.8 |
| Trained / Fine-tuned | | | | | | | | | | | | | | | | | | | |
| CNNGeo [1] | 23.4 | 16.7 | 40.2 | 14.3 | 36.4 | 27.7 | 26.0 | 32.7 | 12.7 | 27.4 | 22.8 | 13.7 | 20.9 | 21.0 | 17.5 | 10.2 | 30.8 | 34.1 | 20.6 |
| A2Net [2] | 22.6 | 18.5 | 42.0 | 16.4 | 37.9 | 30.8 | 26.5 | 35.6 | 13.3 | 29.6 | 24.3 | 16.0 | 21.6 | 22.8 | 20.5 | 13.5 | 31.4 | 36.5 | 22.3 |
| WeakAlign [3] | 22.2 | 17.6 | 41.9 | 15.1 | 38.1 | 27.4 | 27.2 | 31.8 | 12.8 | 26.8 | 22.6 | 14.2 | 20.0 | 22.2 | 17.9 | 10.4 | 32.2 | 35.1 | 20.9 |
| NC-Net [4] | 17.9 | 12.2 | 32.1 | 11.7 | 29.0 | 19.9 | 16.1 | 39.2 | 9.9 | 23.9 | 18.8 | 15.7 | 17.4 | 15.9 | 14.8 | 9.6 | 24.2 | 31.1 | 20.1 |
| HPF [7] | 25.2 | 18.9 | 52.1 | 15.7 | 38.0 | 22.8 | 19.1 | 52.9 | 17.9 | 33.0 | 32.8 | 20.6 | 24.4 | 27.9 | 21.1 | 15.9 | 31.5 | 35.6 | 28.2 |
| SFNet [8] | 26.9 | 17.2 | 45.5 | 14.7 | 38.0 | 22.2 | 16.4 | 55.3 | 13.5 | 33.4 | 27.5 | 17.7 | 20.8 | 21.1 | 16.6 | 15.6 | 32.3 | 35.9 | 26.3 |
| SCOT [9] | 34.9 | 20.7 | 63.8 | 21.1 | 43.5 | 27.3 | 21.3 | 63.1 | 20.0 | 42.9 | 42.5 | 31.1 | 29.8 | 35.0 | 27.7 | 24.4 | 48.4 | 40.8 | 35.6 |
| PMNCfast | 49.5 | 31.6 | 67.1 | 29.8 | 40.2 | 52.0 | 39.0 | 65.2 | 16.2 | 67.9 | 50.4 | 40.3 | 41.4 | 42.9 | 30.2 | 31.1 | 60.4 | 53.8 | 44.7 |
| PMNCbest | 54.1 | 35.9 | 74.9 | 36.5 | 42.1 | 48.8 | 40.0 | 72.6 | 21.1 | 67.6 | 58.1 | 50.5 | 40.1 | 54.1 | 43.3 | 35.7 | 74.5 | 59.9 | 50.4 |

[1] Rocco, et al. 2017. [2] Hongsuck, et al. [3] Rocco, et al. 2018b. [4] Rocco, et al. 2018a. [5] Li, et al. [6] Jeon, et al. [7] Min, et al. [8] Lee, et al. [9] Liu, et al.

FIG. 7

PIXEL CORRESPONDENCE VIA PATCH-BASED NEIGHBORHOOD CONSENSUS

BACKGROUND

Mixed reality, scene understanding, image editing, and other computer vision tasks may involve determining pixel correspondences between two images that are semantically related. As an example, pixels of one image that correspond to particular features, such as an eye of an animal in a scene, can be mapped to pixels in a different image, such as an eye of a different animal in a different scene.

SUMMARY

Examples are disclosed relating to using a neighborhood consensus-based scoring function to determine a pixel correspondence map to relate images. One example provides a computing system comprising a storage machine storing instructions executable by a logic machine to receive a source image and a target image, extract features from the source image to form a source feature map comprising source feature map pixels, extract features from the target image to form a target feature map comprising target feature map pixels, form a correlation map comprising a plurality of similarity scores for a corresponding plurality of pairs of pixels, each pair of pixels comprising a pixel of the source feature map and a pixel of the target feature map, and, based at least on the correlation map, form an initial correspondence map comprising initial mappings between pixels of the source feature map and corresponding pixels of the target feature map. The instructions are further executable to refine the initial correspondence map by, for each of one or more pixels of the source feature map, determining a plurality of candidate correspondences comprising the initial mapping and one or more other candidate mappings of the pixel of the source feature map to one or more other corresponding pixels of the target feature map, for each candidate correspondence, forming a patch comprising the pixel of the source feature map, one or more neighboring pixels of the source feature map, a corresponding pixel of the target feature map, and one or more neighboring pixels of the target feature map, inputting each patch into a trained scoring function, the trained scoring function being configured to output a correctness score, and selecting a refined correspondence based at least upon the correctness scores for the plurality of candidate correspondences. The instructions are further executable to output a refined correspondence map comprising a refined correspondence for each of the one or more pixels of the source feature map.

Another example provides a computing system comprising a storage machine storing instructions executable by a logic machine to train a scoring function and a feature extractor for use in a non-differentiable model by receiving an image pair comprising a source image and a target image, the image pair further comprising a plurality of keypoint annotations, each keypoint annotation comprising a ground truth correspondence that maps a feature map pixel of the source image to a feature map pixel of the target image, extracting, via the feature extractor, features from the source image to form a source feature map comprising source feature map pixels, extracting, via the feature extractor, features from the target image to form a target feature map comprising target feature map pixels; and forming a correlation map comprising a plurality of similarity scores for a corresponding plurality of pairs of pixels, each pair of pixels comprising a pixel of the source feature map and a pixel of the target feature map. The instructions are further executable to, for each keypoint annotation of the plurality of keypoint annotations, for each candidate pixel of a plurality of candidate pixels of the target feature map, obtain a matching score by inputting patch into the scoring function, the patch comprising a mapping of a source feature map pixel associated with the keypoint annotation to the candidate pixel, based on the matching score for the plurality of candidate pixels, form a matching score map, based on the matching score map, determine a predicted probability map by using a differentiable operation, based on the ground truth correspondence associated with the keypoint annotation, determine a ground truth probability map, and determine an annotation error by comparing the predicted probability map to the ground truth probability map. The instructions are further executable to train the scoring function based at least upon an optimization of the annotation error for each source keypoint annotation to form a trained scoring function, and use the trained scoring function in the non-differentiable model.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 7 is a table showing measures of performance for different methods compared to the current method based on a Percent Correct Keypoint metric.

DETAILED DESCRIPTION

Figure 1:
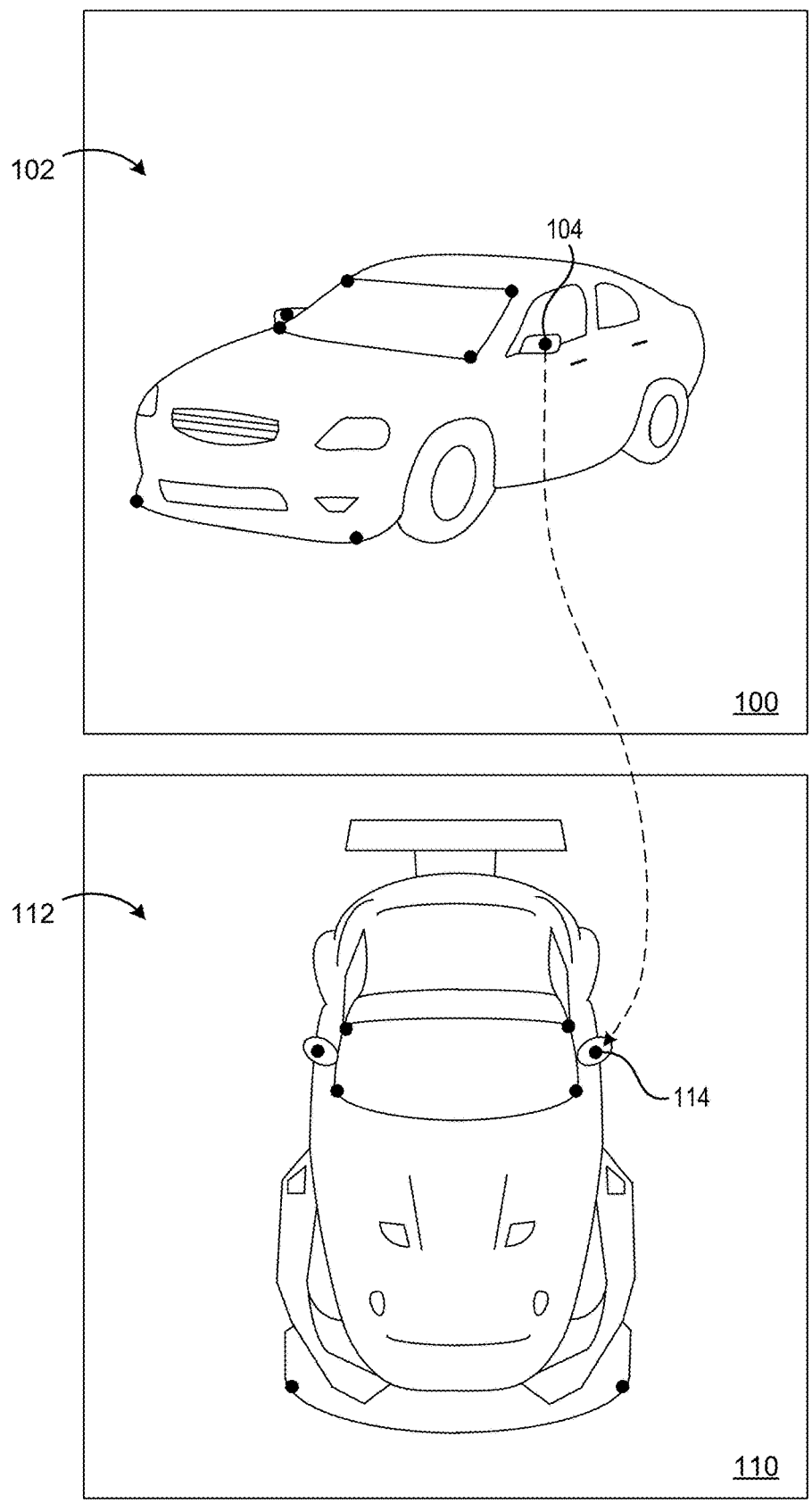
FIG. 1 shows an example image pair comprising a mapping of source keypoints to target keypoints.

Computing pixel correspondence in two or more images can be used in computer vision tasks ranging from three-dimensional vision to image editing and scene understanding. Problem variants where the images depict the same scene (e.g., stereo, optical flow, and wide baseline matching) are well-studied, and various methods are known for computing such correspondences. However, other problem variants may be more challenging to address, such as the dense semantic correspondence task, where the two input images depict semantically related scenes. Such tasks involve finding corresponding pixels for semantically related object parts or scene elements, as opposed to a same scene. FIG. 1 shows one example where keypoints 102 of image 100 are mapped to corresponding keypoints 112 of image 110, as illustrated. In this example, keypoint correspondences are found between different cars in different scenes.

However, large intraclass appearance and shape variations make semantic correspondence challenging. Some current methods for computing semantic correspondences utilize neighborhood consensus, which refers to a variety of techniques for filtering sparse feature matches or dense pixel correspondence based on two-dimensional (2D) spatial context. Various past neighborhood consensus filters were hand-crafted, rather than trained.

Rocco et al. (2018a) [Rocco I, Cimpoi M, Arandjelović R, Torii A, Pajdla T, Sivic J. "Neighbourhood consensus networks," *Advances in Neural Information Processing Systems*, pp. 1651-1662, 2018] proposed NC-Net, which is a trainable neighborhood consensus neural network containing multiple four-dimensional (4D) convolutional layers for robust match filtering. Also, ANC-Net [Shuda Li, Kai Han, Theo W Costain, Henry Howard-Jenkins, and Victor Prisacariu. "Correspondence networks with adaptive neighbourhood consensus," *Proceedings of the IEEE/CVF Conference on Computer Vision and Pattern Recognition*, pp. 10196-10205, 2020, hereinafter, Li, et al.] proposed a similar model with adaptive non-isotropic 4D convolution kernels. However, both of these methods may sacrifice computational efficiency in favor of accuracy. For example, the multiple 4D convolution layers in these models may cause high memory usage and high running times during the forward pass.

Dense correspondence tasks may involve extracting features from an image pair to create feature maps, and determining correspondence based on the similarities between feature map pixel pairs. End-to-end trainable deep neural networks incorporating neighborhood consensus cues may be used for this task. However, these architectures utilize exhaustive matching and 4D convolutions over matching costs for all pairs of feature map pixels, which makes these methods computationally expensive.

PatchMatch (C Barnes, E Shechtman, D B Goldman, A Finkelstein, "The generalized patchmatch correspondence algorithm." *European Conference on Computer Vision*, pp. 29-43, (2010), hereinafter, Barnes, et al.) is a randomized algorithm that may accelerate correspondence searching in image editing tasks while exploiting 2D spatial coherence and smoothness inherent in image correspondence problems. However, conventional PatchMatch may lead to high memory usage and/or slow computation when processing 4D correlation tensors for neighborhood consensus.

Accordingly, examples are disclosed that relate to using a PatchMatch Neighborhood Consensus (PMNC) method in the estimation of dense semantic correspondence between two images with improved efficiency and accuracy compared to other approaches mentioned above. Briefly, a convolutional neural network-(CNN) based feature extractor is applied to source and target images to create source and target feature maps, from which a correlation map is determined. Based on the correlation map, a dense correspondence map is determined using a greedy algorithm. During inference, the dense correspondence map is refined using an example PatchMatch-based method, explained in more detail below. The disclosed example PatchMatch-based method employs a neighborhood consensus-based scoring function that predicts a score based on a patch extracted from the correlation map. Based on the scores, the dense correspondence map is updated to produce a refined correspondence map comprising pixel correspondences between the two images. Unlike other approaches, PMNC does not filter the full correlation map using multiple convolution layers. Rather, the disclosed examples use PatchMatch-based inference on the correlation map. A learned scoring function is used for comparing the similarity of patches in the two images. This scoring function performs convolutions locally on the 4D correlation map to produce a matching score, the function invoked at selective locations in the map. Thus, the function may be used to compare a small number of propagation candidates for each pixel during each PatchMatch iteration. For example, PMNC may compute convolutions on a fraction of the full search space, which may provide for more efficient processing than other methods. As such, the examples disclosed may achieve more efficient computational performance for dense semantic correspondence tasks compared to above-described methods. While described below in the context of 4D correlation maps for comparing two 2D images, it will be understood that the disclosed methods can be applied to data of other dimensionalities, such as cost volumes for comparing 3D voxel data.

The disclosed examples also relate to the training functions for a non-differentiable process. As the disclosed PMNC examples are not differentiable, CNN feature extractors and scoring function in the disclosed examples are not directly trainable using backpropagation. Accordingly, these functions are trained using an end-to-end differentiable proxy model, which produces a feature extractor CNN and scoring function that are then be embedded into a PMNC model. As described below, the CNN-based feature extractor and neighborhood consensus-based 4D scoring function are jointly trained using sparse keypoint supervision. While training the proxy model, the scoring function is invoked densely in the target image for a number of locations in the source image for which ground truth keypoint positions are available. For each keypoint annotation, the dense scores are used to form a 2D predicted probability map (in the case of 2D image data), while the sparse ground truth keypoint positions in the target image are relaxed to ground truth 2D probability maps. The parameters of the feature backbone and the scoring function are then jointly optimized to lessen the deviations between the predicted and ground truth probability maps. Using this training scheme, matching accuracy comparable to methods described above may be obtained with less use of computing resources.

An example PMNC inference pipeline is as follows. Given 2D source and target images, PMNC first computes the feature maps of the given source and target images via a (CNN)-based feature extractor. Then, PMNC computes a 4D correlation map by computing the similarities of pixel-pairs from the source and target feature maps, for example via dot product operations. Next, PMNC computes an initial correspondence map from the correlation map by associating each source feature map pixel of a plurality of source feature map pixels with a corresponding target feature map pixel based upon a highest similarity score. In some examples, this is done for each pixel of the source feature map. Next, PMNC iteratively refines the correspondence map by executing a sequence of PatchMatch propagation-and-update steps, explained in more detail below. Then, PMNC returns a refined correspondence map as an output.

Figure 2:
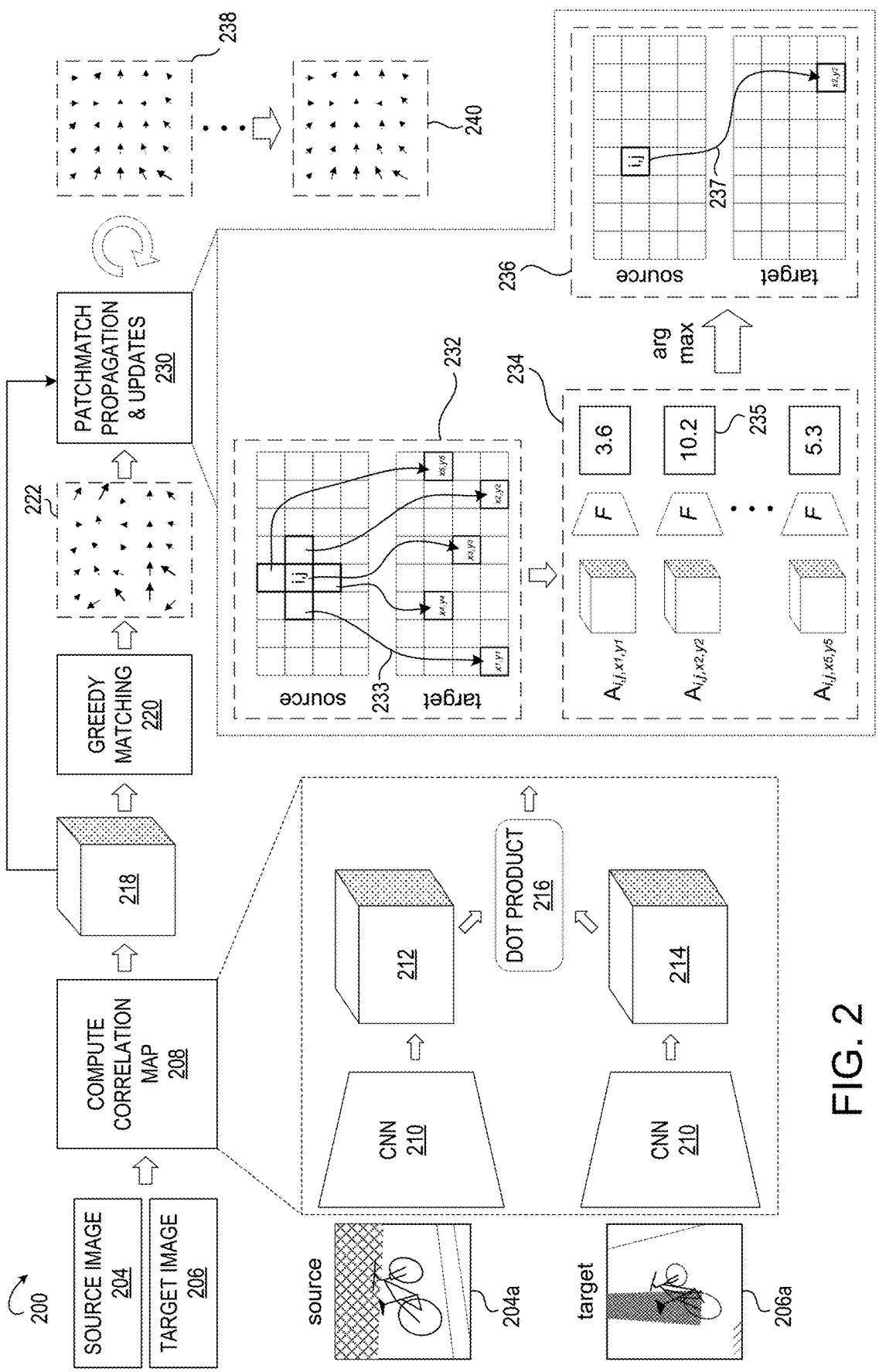
FIG. 2 schematically shows a flow diagram illustrating an example inference pipeline for using a CNN-based feature extractor and a patch-based scoring function to create and refine a correspondence map comprising a mapping of source feature map pixels to target feature map pixels.

FIG. 2 shows an example PMNC inference pipeline 200 for computing semantic correspondences at inference time. Inference pipeline 200 can be implemented as computer-readable instructions stored on one or more computer-readable storage devices and executable by one or more logic machines, examples of which are described below. PMNC inference pipeline 200 computes 208 a correlation map 218 by computing similarities between a source image 204 and target image 206 using image feature descriptors. Example source and target images are shown at 204a and 206a as images both comprising bicycles, but in different scenes and/or contexts. Further, the bicycles in each image may be different.

To compute 208 the correlation map, PMNC inference pipeline 200 employs a CNN-based feature extractor 210 to obtain a source feature map 212 and a target feature map 214. Each feature map comprises a plurality of feature map pixels, and each feature map pixel comprises comprise a feature map vector encoding extracted features. In some examples, PMNC uses a ResNet backbone as a feature extractor 210. In other examples, any other suitable trainable model may be used as a feature extractor, including models other than CNNs (e.g., dense scale-invariant feature transform (SIFT) models).

Similarities between pixels of source feature map 212 and target feature map 214 can be computed in any suitable manner. In the depicted example, a dot product 216 operation is applied to each pair of source/target image pixels to obtain correlation map 218. More particularly, given source image S and target image T, let $f^S \in \mathbb{R}^{H \times W \times d}$ and $f^T \in \mathbb{R}^{H \times W \times d}$ denote the feature maps of the source and target images, respectively. In some examples, PMNC computes a dense 4D correlation map $C \in \mathbb{R}^{H \times W \times H \times W}$ that contains all the pixel-wise similarities $C_{ijkl} = \langle f_{ij}^S, f_{kl}^T \rangle$, where $\langle \cdot, \cdot \rangle$ is the inner product, and $f_{ij}^S \in \mathbb{R}^d$ and $f_{kl}^T \in \mathbb{R}^d$ are the feature vectors with unit norm for the pixels (i,j) and (k,l) from the source and target feature maps, respectively.

After determining the correlation map, PMNC performs PatchMatch optimization to initialize a correspondence map. In the example in FIG. 2, PMNC inference pipeline 200 computes an initial correspondence map 222 from the 4D correlation map 218 via a greedy algorithm 220, in which PMNC iterates over every source pixel of $f^S$ and determines a corresponding pixel in $f^T$ by choosing the corresponding pixel with the largest similarity score, or otherwise with the closest determined measure of similarity. Here, an initial correspondence map $D^0$ that maps source pixels in $f^S$ into target pixels in $f^T$ may be based, for each source pixel, on the determined maximum correlation value of correlation values computed for the source pixel:

$$D_{ij}^0 = \underset{kl}{\mathrm{argmax}}(C_{ijkl}) \in \mathbb{R}^2 \qquad \text{Eq. 1}$$

where $D_{ij}^0$ is the initial mapping for source feature map pixel (i,j), and $C_{ijkl}$ is the correlation map 218.

The initial correspondence map is obtained from pure pixel-wise correlations without neighborhood consensus. However, the initial correspondence map $D^0$ may contain incorrect correspondences. As such, the initial correspondence map is refined via one or more propagation-and-update steps 230. During propagation, PMNC samples candidate correspondences at 232, evaluates each candidate correspondence at 234, and updates the correspondence map at 236. As illustrated at 232, PMNC determines candidate correspondences 233 for pixel (i,j) based upon a correspondence of a neighboring pixel to target feature map pixel ($x_1$, $y_1$). In this example, pixel (i,j) and the four neighboring feature map pixels determine a set of five correspondence candidates: ($x_1$, $y_1$), ($x_2$, $y_2$), ($x_3$, $y_3$), ($x_4$, $y_4$), and ($x_5$, $y_5$). More generally, for each source pixel (i,j), PMNC obtains a set of candidate correspondences $S_{ij}^k$ from the correspondence of adjacent pixels in the correspondence map:

$$S_{ij}^k = \{D_{ij}^k, D_{ij+1}^k, D_{ij-1}^k, \ldots\} \qquad \text{Eq. 2}$$

where $D^k$ is the correspondence map at iteration k. The adjacent pixels are chosen using the propagation kernel, which defines the shape of the local neighborhood candidate. In other examples, any suitable method for determining a set of candidate correspondences may be employed.

After a set of candidate correspondences has been determined, PMNC uses a learned scoring function to evaluate each propagation candidate. Given the set of propagation candidates $S_{ij}^k$, PMNC evaluates each candidate correspondence by inputting a 4D patch for the candidate correspondence into the scoring function to obtain a score for the candidate correspondence. The 4D patches are extracted or cropped from correlation map 218. Each 4D patch comprises a source feature map pixel (i,j), one or more neighboring source feature map pixels, a target feature map pixel (k,l), and one or more neighboring target feature map pixels. The four dimensions of the 4D patch correspond to (i, j, k, l) for each correspondence. For example, an example 4D patch of size r from the correlation map C at pixels (i,j) and (k,l) can be represented by the following expression:

$$A_{ijkl} = C_{i-\frac{r}{2}:i+\frac{r}{2}, j-\frac{r}{2}:j+\frac{r}{2}, k-\frac{r}{2}:k+\frac{r}{2}, l-\frac{r}{2}:l+\frac{r}{2}} \qquad \text{Eq. 3}$$

where $A_{ijkl}$ is the 4D patch, (i,j) corresponds to a source feature map pixel, and (k,l) corresponds to a target feature map pixel. Using Eq. 3, patch $A_{ijkl}$ crops a 4D patch from C by grabbing r elements in each dimension. For example, with r=3, patch A comprises a 3×3×3×3 patch with 81 elements. As such, the patch size scales as $r^4$.

Scoring function F predicts a correctness of a correspondence and outputs a correspondence score. Unlike other methods discussed above, scoring function F predicts the correctness of a correspondence (i,j)⇆(k,l) given a 4D patch $A_{ijkl}$ extracted from the correlation map C. As 4D convolutions of the whole correlation map C can be computationally expensive and have large memory footprints, PMNC uses a 4D scoring function that applies 4D convolutions on a selected 4D patch extracted from the correlation map. By using convolutions on a 4D patch, PMNC reduces the computational complexity and memory footprint compared to other methods.

Scoring function F maps a 4D patch of size r to a single value:

$$F: \mathbb{R}^{r \times r \times r \times r} \to \mathbb{R}$$

where r represents the size of the patch in each dimension. As discussed below, scoring function F is trained by using a neural network composed of one or more 4D convolutions and one or more ReLU (rectified linear unit) layers. As one example, Table 1 below shows the architecture of F for a 4D patch of size r=7. In this example, the scoring function Fuses two layers composed of 4D convolutions followed by ReLU non linearities. The last convolution layer produces a single matching score.

TABLE 1

Example scoring function architecture.

| Layer | Number of Filters | Filter Size | Output Size |
|---|---|---|---|
| Convolution | 16 | 3 × 3 × 3 × 3 | 5 × 5 × 5 × 5 |
| ReLU | — | — | 5 × 5 × 5 × 5 |
| Convolution | 16 | 3 × 3 × 3 × 3 | 3 × 3 × 3 × 3 |
| ReLu | — | — | 3 × 3 × 3 × 3 |
| Convolution | 1 | 3 × 3 × 3 × 3 | 1 × 1 × 1 × 1 |

After scoring candidate correspondences, PMNC updates the correspondence map by taking the correspondence value with the highest score. Mathematically, this operation can be described as follows:

$$D_{ij}^{k+1} \arg\max(\{F(A_{ij,(S_{xy}^k)}) | D_{xy}^k \in S_{ij}^k\})$$ Eq. 4 where F is a scoring function, $A_{ij,(D_{xy}^k)}$ is a 4D patch cropped from C, $D_{xy}^k$ is a candidate feature map pixel at iteration k, $S_{ij}^k$ is the set of propagation candidates, and $D_{ij}^{k+1}$ is the correspondence for source feature map pixel (i,j) at the subsequent iteration. Patch $A_{ij,(D_{xy}^k)}$ (is cropped from C using Eq. 3 using any suitable value for r. Each 4D patch associates the source feature map pixel (i,j) and a candidate target feature map pixel $D_{xy}^k$.

Referring again to FIG. 2, an example candidate correspondence evaluation and update is illustrated at 234 and 236. Scoring function F evaluates patch $A_{i,j,x_2,y_2}$ and determines a correspondence score 235 (here shown as 10.2). At 236, PMNC updates the correspondence for pixel (i,j) based on the highest correspondence score. In the example shown, score 235 represents the highest correspondence score and score 235 is associated with patch $A_{i,j,x_2,y_2}$ thus PMNC updates the correspondence map with correspondence 237 which maps pixel (i,j) to pixel (x₂, y₂). The correspondence may be updated using Eq. 4 above.

As a result of each propagation-and-update step, PMNC produces a refined correspondence map 238. PMNC may repeat the propagation and update process (i.e., 232, 234, and 236) until the correspondence map converges. Once the correspondence map has reached a targeted level of convergence, PMNC inference pipeline 200 outputs a final refined correspondence map 240. In some examples, convergence may be achieved when an update iteration produces no changes, i.e., $D^k = D^{k-1}$. In other examples, any other suitable convergence criteria may be used, e.g., criteria based on the number of pixels converged. In other examples, PMNC may perform a predetermined number of iterations at 230 (e.g., two iterations).

As mentioned above, a PMNC inference pipeline (e.g. pipeline 200) is not differentiable, and thereby cannot be trained by back propagation. Accordingly, to train the feature extractor and scoring function of a PMNC inference pipeline, a proxy problem can be defined and used in a training procedure to learn the parameters of these components. In some examples, the training procedure uses sparse labeled keypoint matches of a training image pair for supervision. Each labeled keypoint match comprises a correspondence between a keypoint annotation (i,j) of a source image and a ground truth target correspondence (k,l) of a target image. During training, a correlation map is computed for the training image pair, as described above (e.g., 208 of FIG. 2). For each keypoint annotation (i,j), PMNC evaluates all the candidate target pixels (x, y) by predicting their matching scores from their 4D-patches $A_{ijkl}$ using the scoring function F. PMNC then computes a 2D matching score map by arranging all the predicted scores following the pixel ordering of the target image. Next, by applying a differentiable function (e.g., softmax operation) over the 2D matching score map, the training procedure obtains a 2D probability map $\hat{P}_{ij}$ over the pixels in the target image. The training procedure computes a 2D probability map $\hat{P}_{ij}$ for each source keypoint annotation. This proxy problem allows the feature extractor and patch scoring function F to produce meaningful results when PMNC uses PatchMatch as an alternative to the exhaustive matching algorithm.

Figure 3:
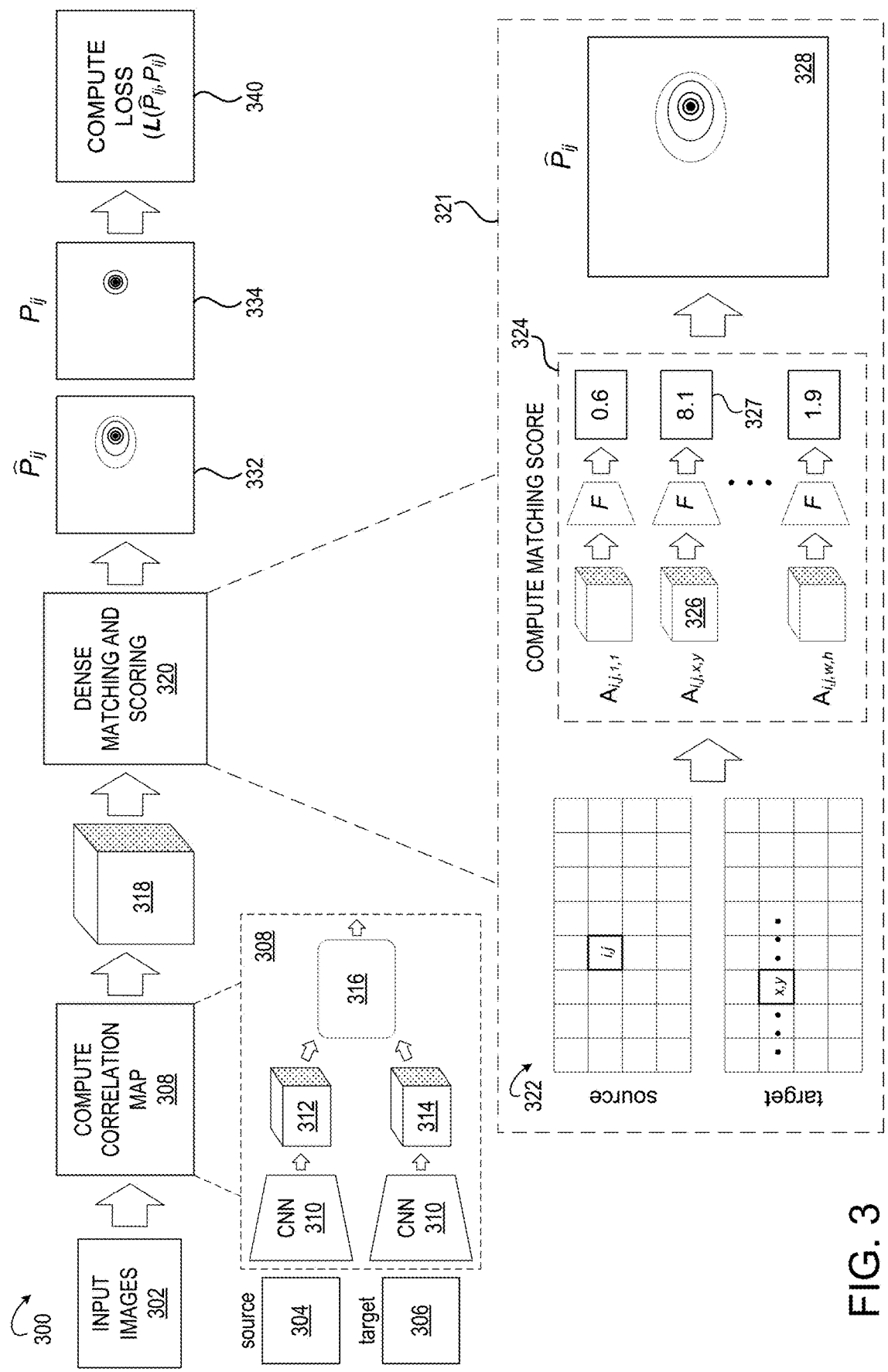
FIG. 3 schematically shows a flow diagram illustrating an example training pipeline for training a CNN-based feature extractor and a patch-based scoring function for use in a non-differentiable semantic correspondence function.

FIG. 3 illustrates an example training pipeline 300. An input image pair 302 (shown as source image 304 and target image 306) comprises labeled keypoint annotations used for training. At 308, training pipeline 300 computes a 4D correlation map encoding similarities between source image 304 and target image 306. More specifically, a CNN-based feature extractor 310 is used to obtain a source feature map 312 and a target feature map 314 from source image 304 and target image 306. As before, a dot product operation 316 performed on each pixel pair of source feature map 312 and target feature map 314 may be used to compute correlation map 318.

Based on correlation map 318, PMNC performs dense matching and scoring at 320 for one or more source keypoint annotations. Box 321 illustrates a dense scoring and matching process to obtain a predicted probability map for pixel (i,j), and may be performed for each source keypoint annotation. For a pixel (i,j), PMNC evaluates all possible candidate target pixels at 322, and predicts associated matching scores at 324 using neural network scoring function F. For each candidate target pixel, PMNC extracts a 4D patch from correlation map 318 and feeds it into scoring function F to obtain a matching score for the candidate target pixel. Scoring function F is composed of 4D convolutions that predict a matching score indicating the correctness of the (i,j)⇔(x, y) correspondence. For example, 4D patch 326 may be extracted for candidate pixel (x, y) and input into F to produce matching score 327. To produce a 2D probability map 328 for pixel (i,j), training pipeline 300 composes the matching scores and applies a 2D softmax operator. The 2D ground truth probability map corresponding to 2D probability map 328 is obtained by centering a Gaussian distribution at the correct matching target pixel for the source annotation (i,j).

In this example, training pipeline 300 uses the ground truth correspondences in the datasets to generate a set of ground-truth 2D probabilistic maps by placing a Gaussian distribution centered on the correct matching target pixels. For example, the ground truth 2D probability map $P_{ij}$ may be computed as a Gaussian distribution centered at the ground truth target correspondence (k,l) in $f^T$, i.e., $$P_{ij} = \mathcal{N}((k,l)\sigma) \in \mathbb{R}^{H \times W}$$ Eq. 5 where σ is the standard deviation denoting uncertainty. In a preferred embodiment, σ is set to 0.6, but any suitable value may be used. Each predicted probability map 322 and corresponding ground truth probability map 324 are then compared using an entropy loss function at 340, or other suitable loss function.

Training pipeline 300 then learns the parameters of CNN-based feature extractor 310 and neural network F by minimizing the sum of the cross entropy losses comparing deviations from the predicted and ground-truth probabilistic maps. Given ground truth probability maps $P_{ij}$ and predicted probability maps $\hat{P}_{ij}$, a cross entropy loss can be used to compare the deviation of the two probability distributions. The total entropy loss is a sum over all keypoint annotations (i,j). For example, the loss may be computed as:

$$\mathcal{L} = \Sigma_{ij} H(P_{ij}, \hat{P}_{ij}) \quad \text{Eq. 6}$$

where σ is the total entropy loss and H(•) is the cross entropy loss function. During training, σ is minimized over the parameters of the scoring function F and the CNN-feature extractor using backpropagation.

Using the methods described above, two configurations of PMNC were obtained and tested on publicly available datasets: PF-Pascal [Bumsub Ham, Minsu Cho, Cordelia Schmid, and Jean Ponce, "Proposal flow: Semantic correspondence from object proposals," *Proceedings of the IEEE Conference on Computer Vision and Pattern Recognition*, pp. 3475-3484 (2016)] and SPair-71K [Juhong Min, Jongmin Lee, Jean Ponce, and Minsu Cho, "Hyperpixel flow: Semantic correspondence with multi-layer neural features," *Proceedings of the IEEE International Conference on Computer Vision*, pp. 3395-3404 (2019)].

Figure 4:
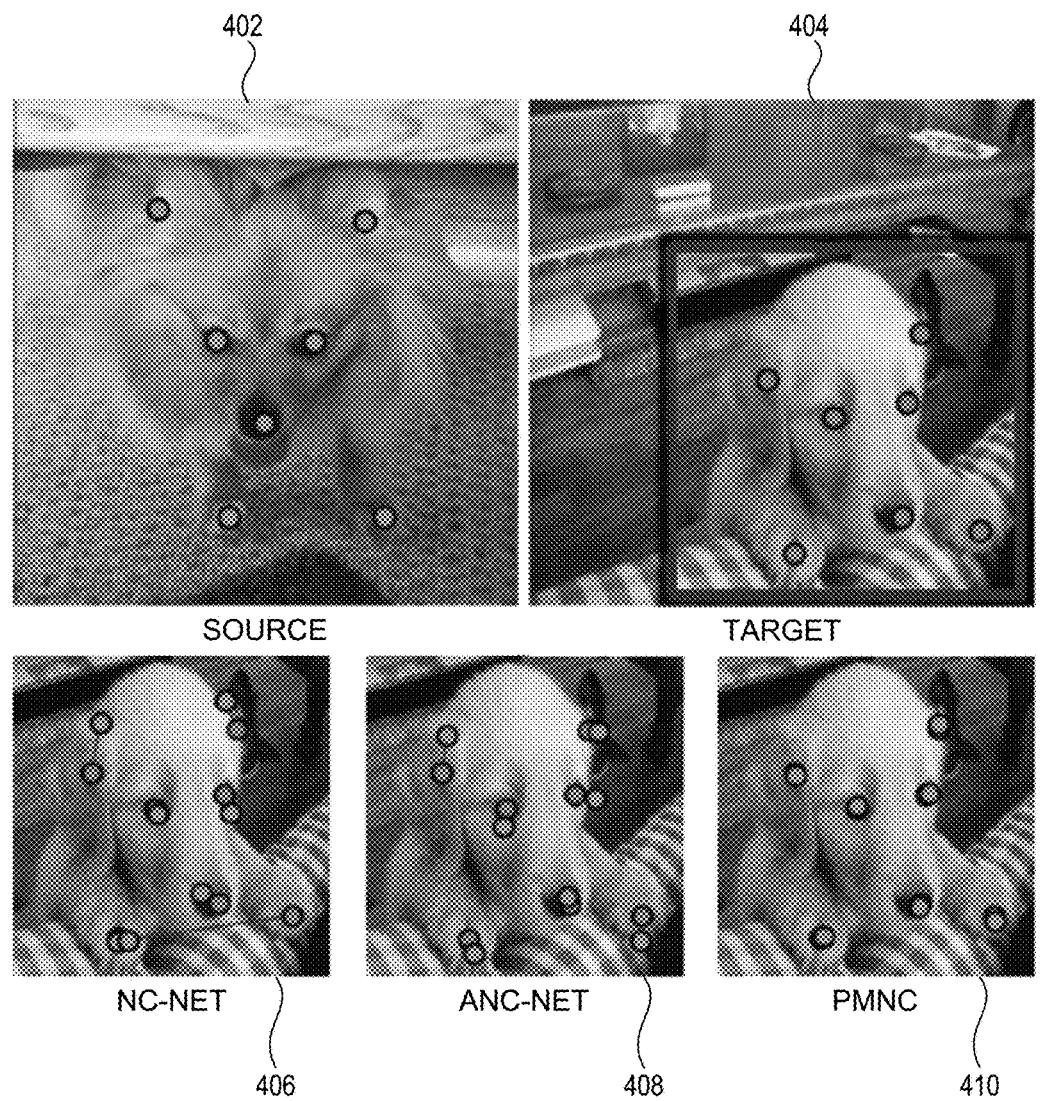
FIG. 4 depicts an example pixel correspondence map obtained via an example trained patch-based scoring function, and comparative correspondence maps obtained via other methods.

FIG. 4 shows an image pair from PF-Pascal with ground truth keypoint annotations. Source image 402 comprises 7 source keypoints and target image 404 comprises 7 ground truth correspondences for the source keypoints. The bottom images illustrate keypoint transfer results on the target image from dense correspondence computed by NC-Net (Rocco, et al., image 406), ANC-Net (Li, et al., image 408), and PMNC (image 410). Larger errors in images 406, 408 are shown with lines connecting predicted keypoints to expected ground truth keypoints. As seen in image 410, the predicted and expected keypoints are almost overlapping, indicating that PMNC produces more accurate semantic correspondences compared to the other two methods. Experiments show that PMNC achieves the highest accuracy while using less memory and being faster compared to other methods tested.

Tables 2, 3, 700 (FIG. 7), and 800 (FIG. 8) show results on the PF-Pascal and SPair-71K datasets. The measured timings reflect experiments performed on a PC with an Intel Core i9-720X 2.9 Ghz CPU, 64 GB of DDR4 266 Mhz RAM, and an Nvidia RTX 2080TI GPU. The experiments employed the Percent Correct Keypoint (PCK) metric [Yi Yang and D. Ramanan, "Articulated human detection with flexible mixtures of parts," *IEEE Transactions on Pattern Analysis and Machine Intelligence*, 35(12):2878-2890, December 2013.] to measure the precision of the sparse semantic correspondence with variable threshold α. Experiments with a smaller a reflect a stricter measure. For PF-Pascal, α is scaled by the larger image dimension, and for SPair-71K, α is scaled by the larger dimension of the object's bounding box.

$PMNC_{fast}$ and $PMNC_{best}$ denote the two tested configurations. $PMNC_{fast}$ uses spatial resolution equivalent to the fourth layer of ResNet-101, which resizes the original image by 1/16 with r=5. $PMNC_{best}$ uses the third layer of ResNet-101, which resizes the original image by 1/8 with r=7. Both configurations use 1546 feature map channels of ResNet-101. Images are at 400×400 pixel resolution and σ is set to 0.6. The experiments use two PatchMatch iterations, except in the parameter study.

The PF-Pascal dataset contains 1351 image pairs selected from the Pascal VOC [Mark Everingham, Luc Gool, Christopher K. Williams, John Winn, and Andrew Zisserman, "The pascal visual object classes (voc) challenge," *Int. J. Comput. Vision*, 2010] dataset, where the ground truth keypoint matches were manually annotated. The dataset is split into around 700, 300, and 300 pairs for training, validation, and test, respectively. While NC-Net [Rocco et al. (2018a)] uses both source-to-target and target-to-source pairs, the experimental evaluation discussed herein uses source-to-target pairs (no target-to-source pairs).

TABLE 2

Evaluation on the PF-Pascal dataset.

| Method | α 0.1 | 0.05 | 0.03 | 0.01 | Time (s) | Memory (MB) |
|---|---|---|---|---|---|---|
| NC-Net | 79.0 | 54.3 | 30.9 | 4.9 | 0.29 | 406 |
| ANC-Net | 85.9 | 58.1 | 31.9 | 5.1 | 0.33 | 1310 |
| GSF | 84.5 | 62.8 | — | — | — | — |
| PMNCfast | 86.8 | 74.5 | 58.0 | 14.7 | 0.09 | 273 |
| PMNCbest | 90.6 | 82.4 | 71.6 | 29.1 | 0.96 | 2610 |

As seen in Table 2, PMNC achieves better PCK and timings compared to NC-Net (Rocco et al. 2018a), ANC-Net (Li et al.), and GSF [Sangryul Jeon, Dongbo Min, Seungryong Kim, Jihwan Choe, and Kwanghoon Sohn, "Guided semantic flow," *European Conference on Computer Vision*, pp. 631-648, Springer, 2020, hereinafter Jeon et al.]. Table 2 presents the PCK metric in bold for α∈[0.01, 0.1], the inference time in seconds, and memory requirements in megabytes (MB). At any precision threshold α, $PMNC_{best}$ outperforms all the baselines, but utilizes longer inference times and more memory. $PMNC_{fast}$ still achieves higher PCK values compared to those of NC-Net, ANC-Net and GSF, while requiring significantly less time and memory.

Figure 5:
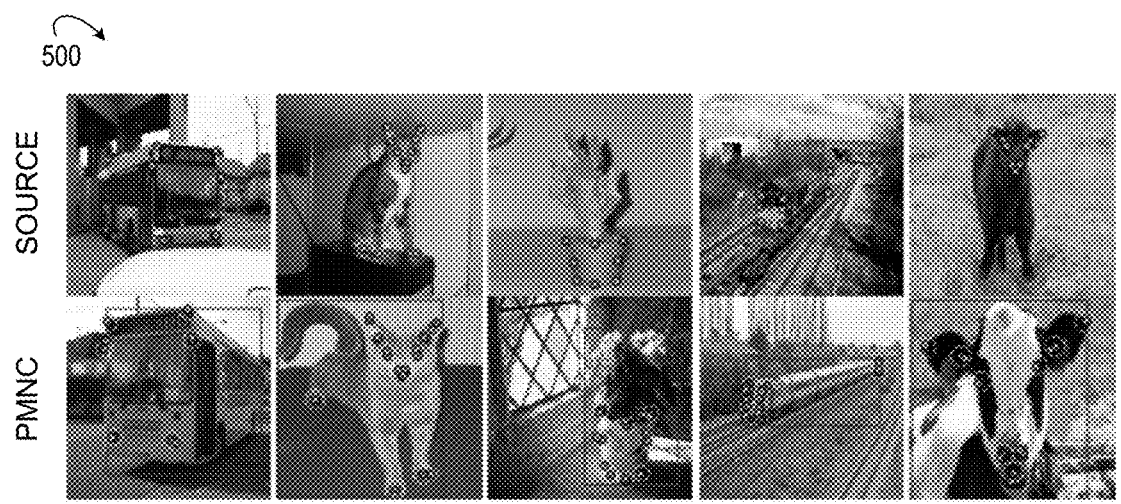
FIG. 5 shows examples of source/target image pairs including source keypoints and transferred keypoints as determined by a PatchMatch Neighborhood Consensus model.

FIG. 5 shows results using $PMNC_{best}$ for a set of example images 500 from the SPair-71K dataset. The image pairs in FIG. 5 have view-point, scale, and/or illumination changes. Dots in the source images (top row) indicate locations of source keypoints. The bottom row shows target images with dots indicating predicted correspondence locations and ground truth correspondences (dots in circles). The circles indicate the PCK threshold α=0.05. Predicted correspondences mostly lie within the circles. The 2D bounding boxes are not used in the method. The results suggest that $PMNC_{best}$ may achieve accurate correspondences despite changes in view-point, scale, or illumination.

Figure 6:
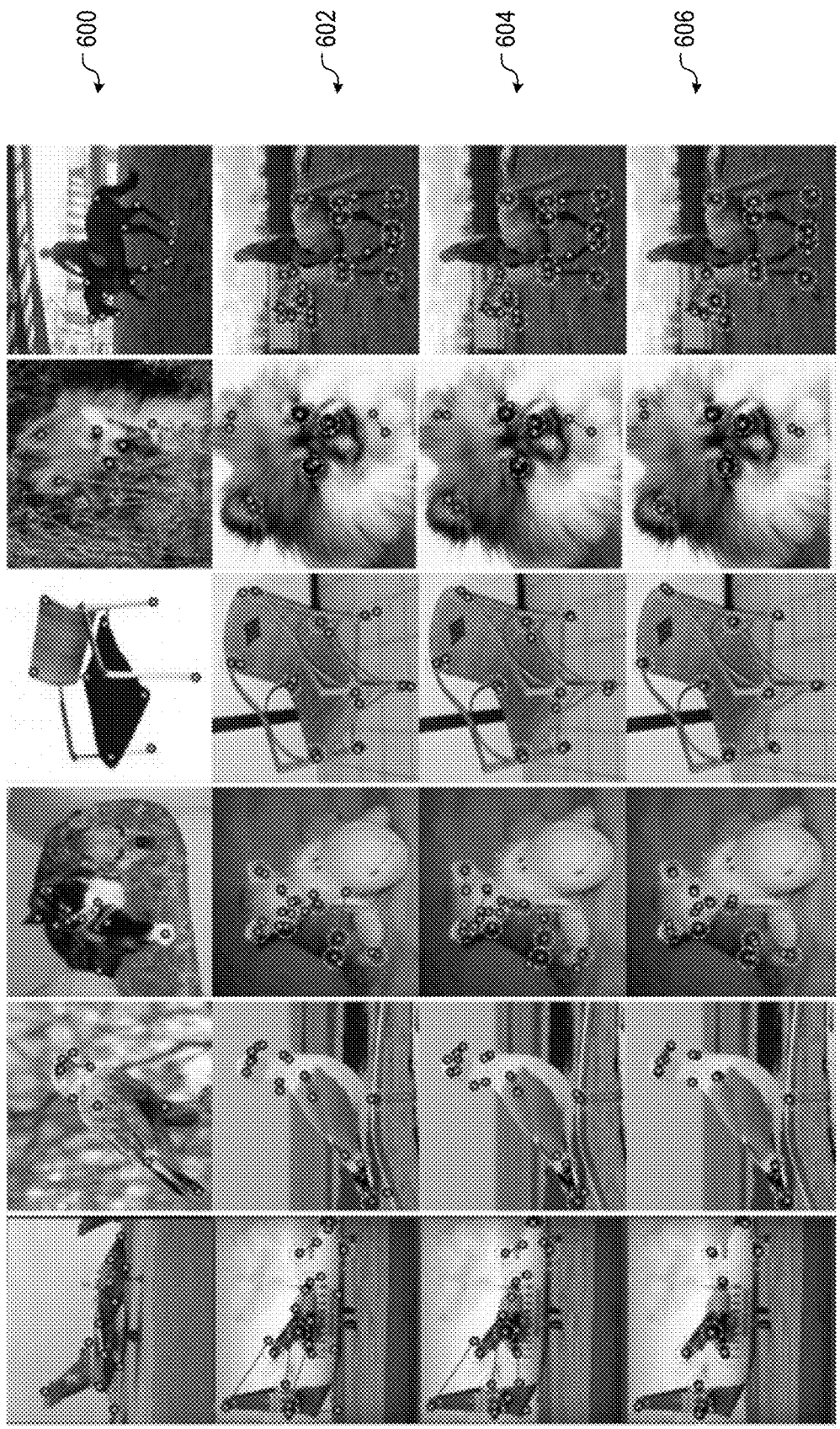
FIG. 6 shows examples of source/target image pairs illustrating correspondence errors for a PatchMatch Neighborhood Consensus model and two baseline models for comparison.

FIG. 6 shows visualizations of semantic correspondences obtained from the evaluations on the PF-Pascal dataset. FIG. 6 shows six different source images in row 600 (i.e., plane, bird, cat, chair, dog, horse), and the computed correspondences in the subsequent rows for NC-Net (row 604), ANC-Net (row 606), and PMNC (row 608). Dots in row 602 indicate locations of source keypoints. Rows 604, 606, 608 visualize pixel correspondence between predicted target correspondence locations and ground truth locations shown as dots inside circles. The circles indicate the PCK threshold α=0.05 and lines indicate correspondence errors. The baseline methods in rows 604 and 606 tend to produce larger pixel correspondence errors as many more lines are visible. In contrast, the lines are not visible in row 608, indicating that PMNC may produce smaller pixel correspondence errors. Moreover, the predictions from PMNC mostly fall inside the circles.

Table 3 reports the PCK metric under different α thresholds and shows the effect of parameters in PMNC performance. The top five rows of Table 3 show that increasing the PatchMatch iterations has a meaningful PCK improvement up to two iterations. However, more than two iterations may have relatively less impact on PCK. Therefore, a small number of PatchMatch iterations may be sufficient to fix most of the incorrect correspondences.

TABLE 3

Effects of parameters in PMNC.

| # Iter. | σ | r | α 0.01 | 0.03 | 0.05 | 0.1 |
|---|---|---|---|---|---|---|
| 0 | 0.60 | 7 × 7 | 15.2 | 60.8 | 77.9 | 89.4 |
| 1 | 0.60 | 7 × 7 | 26.7 | 70.2 | 81.9 | 90.4 |
| 2 | 0.60 | 7 × 7 | 29.1 | 71.0 | 82.4 | 90.6 |
| 3 | 0.60 | 7 × 7 | 29.0 | 70.7 | 81.9 | 91.2 |
| 4 | 0.60 | 7 × 7 | 29.4 | 71.0 | 82.1 | 91.1 |
| 2 | 0.15 | 7 × 7 | 27.6 | 69.2 | 80.9 | 88.7 |
| 2 | 0.30 | 7 × 7 | 31.4 | 70.3 | 80.1 | 88.4 |
| 2 | 0.45 | 7 × 7 | 30.0 | 71.1 | 80.1 | 89.2 |
| 2 | 0.60 | 7 × 7 | 29.1 | 71.0 | 82.4 | 90.6 |
| 2 | 0.75 | 7 × 7 | 24.4 | 68.3 | 80.6 | 91.0 |
| 2 | 0.90 | 7 × 7 | 20.0 | 62.7 | 78.4 | 90.3 |
| 2 | 0.60 | 3 × 3 | 13.7 | 57.8 | 71.8 | 84.7 |
| 2 | 0.60 | 5 × 5 | 29.7 | 70.4 | 80.4 | 89.1 |
| 2 | 0.60 | 7 × 7 | 29.1 | 71.0 | 82.4 | 90.6 |

Furthermore, the results in Table 3 above show a positive correlation between σ and α. The six middle rows of Table 3 show that using larger σ values for generating the ground-truth probabilistic maps may improve performance when using larger α values. This is because a larger σ relaxes the ground-truth probability map, which corresponds to the larger PCK tolerance. Finally, the bottom three rows of Table 3 show that the larger the patch, the better the performance across many performance thresholds (i.e., α values). While use of larger patches may improve accuracy, larger patches may be associated with a higher computational cost.

FIG. 7 shows results on eighteen object categories in Table 700. The results shown in Table 700 reflect PCK evaluations on SPAIR-71K which has image pairs with occlusions (unlike PF-PASCAL) and larger viewpoint and scale variations. It has 70,958 image pairs with 53,340 for training; 5,384 for validation; and 12,234 for testing. The provided subsets are used in experiments. Table 700 shows results for PMNC compared to various other methods: CNNGeo (Rocco et al. 2017) [Ignacio Rocco, Relja Arandjelovic, and Josef Sivic, "Convolutional neural network architecture for geometric matching," *Proceedings of the IEEE conference on computer vision and pattern recognition*, pp. 6148-6157, 2017]; A2Net (Hongsuck et al.) [Paul Hongsuck Seo, Jongmin Lee, Deunsol Jung, Bohyung Han, and Minsu Cho, "Attentive semantic alignment with offset-aware correlation kernels," *European Conference on Computer Vision*, pp. 367-383. Springer, 2018]; WeakAlign (Rocco et al. 2018b) [Ignacio Rocco, Relja Arandjelovi´c, and Josef Sivic, "End-to-end weakly-supervised semantic alignment," *Proceedings of the IEEE Conference on Computer Vision and Pattern Recognition*, pp. 6917-6925, 2018]; NC-Net (Rocco et al. 2018a); ANC-Net (Li et al.); GSF (Jeon et al.); HPF (Min et al.) [Juhong Min, Jongmin Lee, Jean Ponce, and Minsu Cho, "Hyperpixel flow: Semantic correspondence with multi-layer neural features," *Proceedings of the IEEE International Conference on Computer Vision*, pp. 3395-3404, 2019]; SFNet (Lee et al.) [Junghyup Lee, Dohyung Kim, Jean Ponce, and Bumsub Ham, "Sfnet: Learning object-aware semantic correspondence," *Proceedings of the IEEE Conference on Computer Vision and Pattern Recognition*, pp. 2278-2287, 2019]; and SCOT (Liu, et al.) [Yanbin Liu, Linchao Zhu, Makoto Yamada, and Yi Yang, "Semantic correspondence as an optimal transport problem," *Proceedings of the IEEE/CVF Conference on Computer Vision and Pattern Recognition*, pp. 4463-4472, 2020].

Figure 8:
FIG. 8 is a table showing measures of performance for different methods for producing pixel correspondence maps.

The top section of Table 700 reports performance when models are trained on PF-Pascal and tested on SPair-71K. $PMNC_{best}$ performs best on the most reported categories and has the second highest PCK. This shows that PMNC models trained on PF-Pascal may generalize reasonably well to SPAIR-71K. The bottom section of Table 700 shows results for methods trained on SPAIR-71K. It can be seen that $PMNC_{best}$ has the highest PCK for 14/18 categories. $PMNC_{fast}$ ranks second in 16/18 categories. Overall, we outperform existing works by a significant margin for all categories except chair and bottle. The best overall PCK of 50.4 was received with $PMNC_{best}$. The next best method (excluding own $PMNC_{fast}$) is SCOT [Liu et al.] at 35.6. Table 800 in FIG. 8 shows how difficulty level affects PCK for each method. $PMNC_{best}$ is the best and $PMNC_{fast}$ is the second best method for all the categories. Also, the performance margin over baselines improves going from easy to hard. The results suggest that $PMNC_{best}$ may achieve improved accuracy compared to other pre-trained models and other fine-tuned models.

While the examples disclosed incorporate neighborhood consensus and directly use sparse keypoint supervision, there are notable differences to prior work. For example, cross-entropy loss is used to compare the predicted and ground truth 2D probability maps during training. In contrast, ANC-Net uses L2 loss to minimize a different measure of distributional difference, and adds a second loss to encourage one-to-one matching [Li, et al.]. Further, the learned 4D scoring function may be applied multiple times in an iterative fashion at selective locations in the 4D feature correlation map. In contrast, ANC-Net applies the learned 4D filters on two 4D tensors, the first of which is a correlation map and the second one is computed by a self-similarity module [Li, et al.].

Figure 9:
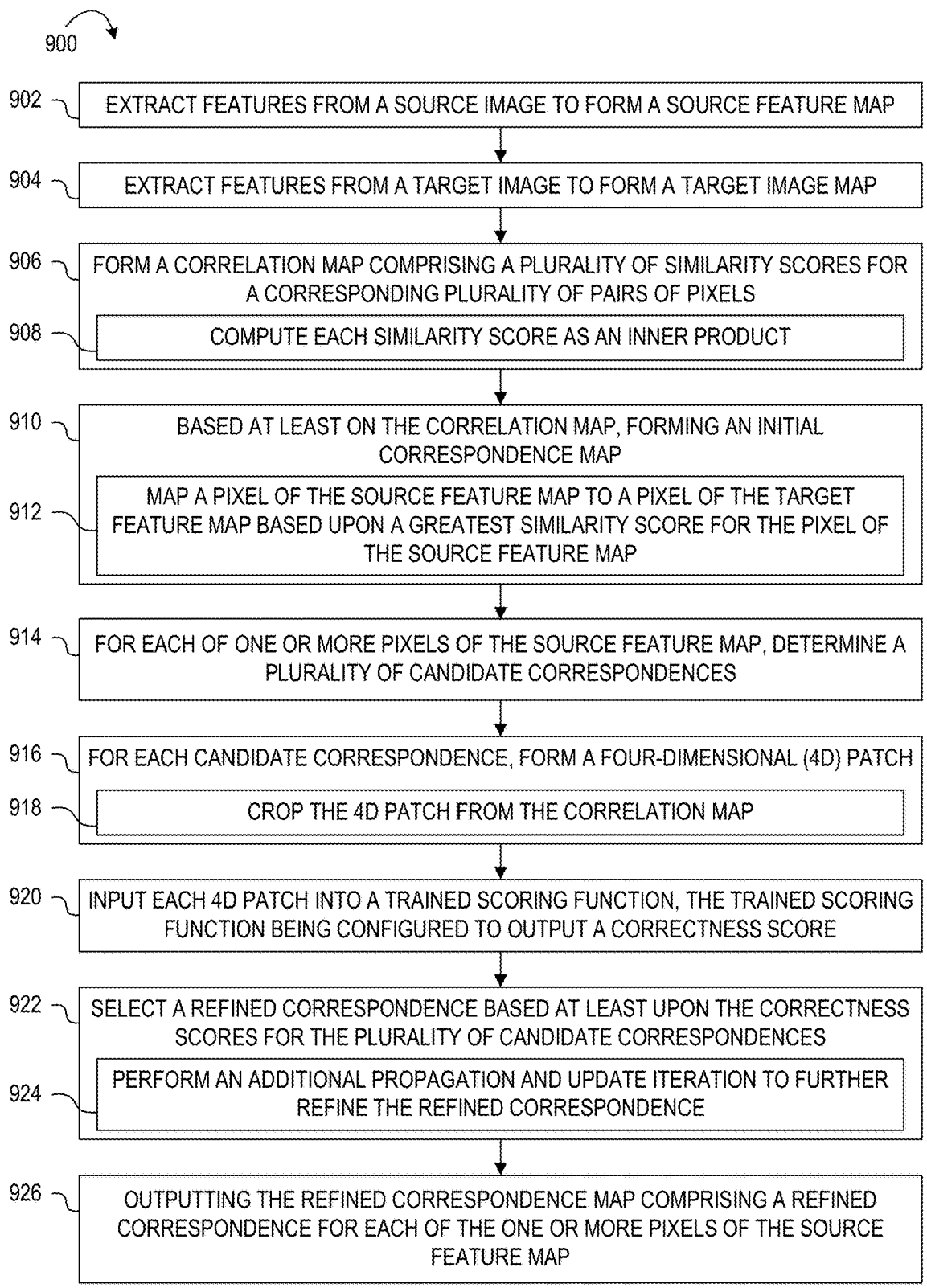
FIG. 9 shows a flow diagram illustrating an example method for creating a refined correspondence map using a patch-based scoring function.

FIG. 9 shows a flow diagram for an example method 900 of using a trained scoring function to obtain a pixel correspondence between two images. At 902, the method comprises extracting features from a source image to form a source feature map. At 904, the method comprises extracting features from a target image for form a target feature map. Method 900 further comprises, at 906, forming a correlation map comprising a plurality of similarity scores for a corresponding plurality of pairs of pixels. Each pair of pixels comprises a pixel of the source feature map and a pixel of the target feature map. In some examples, method 900 comprises, at 908, computing each similarity score as an inner product between a feature vector corresponding to a pixel of the source feature map and a feature vector corresponding to a pixel of the target feature map.

At 910, method 900 comprises forming an initial correspondence map based at least on the correlation map. The initial correspondence map comprises an initial mapping of pixels of the source feature map to pixels of the target feature map. At 912, forming the initial correspondence map may comprise, for each pixel of the source feature map, mapping the pixel of the source feature map to a pixel of the target feature map based upon a greatest similarity score for the pixel of the source feature map.

Continuing, at 914, method 900 comprises, for each of one or more pixels of the source feature map, determining a plurality of candidate correspondences comprising the initial mapping and one or more other candidate mappings of the pixel of the source feature map to one or more other corresponding pixels of the target feature map. At 916, the method comprises forming a four-dimensional (4D) patch for each candidate correspondence. Each 4D patch comprises the pixel of the source feature map, one or more neighboring pixels of the source feature map, a corresponding pixel of the target feature map, and one or more neighboring pixels of the target feature map. In some examples, at 918, the method comprises cropping the 4D patch from the correlation map. The 4D patch may be obtained according to $$A_{ijkl} = C_{i-\frac{r}{2}:i+\frac{r}{2}, j-\frac{r}{2}:j+\frac{r}{2}, k-\frac{r}{2}:k+\frac{r}{2}, l-\frac{r}{2}:l+\frac{r}{2}},$$

wherein $A_{ijkl}$ is a 4D patch for pixel (i,j) of the source feature map and pixel (k,l) of the target feature map, C is the correlation map, and r is the number of pixels in each dimension of the 4D patch. In other examples, the patch may have any other suitable dimensionality, e.g. in the case of three-dimensional voxel data.

Continuing at 920, the method further comprises inputting each 4D patch into a trained scoring function, the trained scoring function being configured to output a correctness score. At 922, the method comprises selecting a refined correspondence based at least upon the correctness scores for the plurality of candidate correspondences. In some examples, at 924, the method comprises performing one or more additional propagation and update iterations (e.g., step 230) to further refine the refined correspondence. Iterations may be performed a fixed number of times, or until appropriate convergence criteria is met. At 926, the method further comprises outputting the refined correspondence map comprising a refined correspondence for each of the one or more pixels of the source feature map.

Figure 10A:
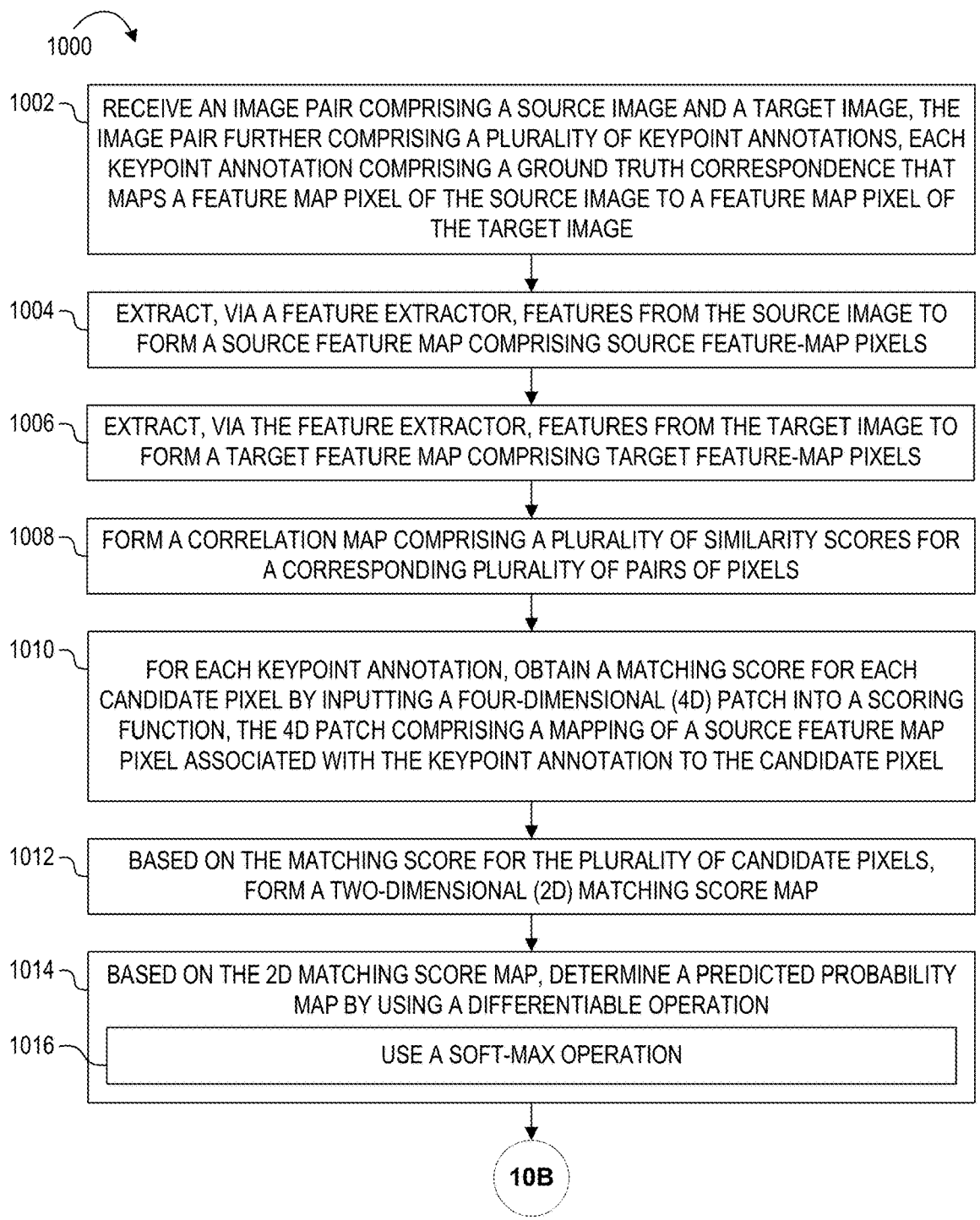
FIGS. 10A-10B shows a flow diagram illustrating an example method for training a 4D patch-based scoring function.
Figure 10B:
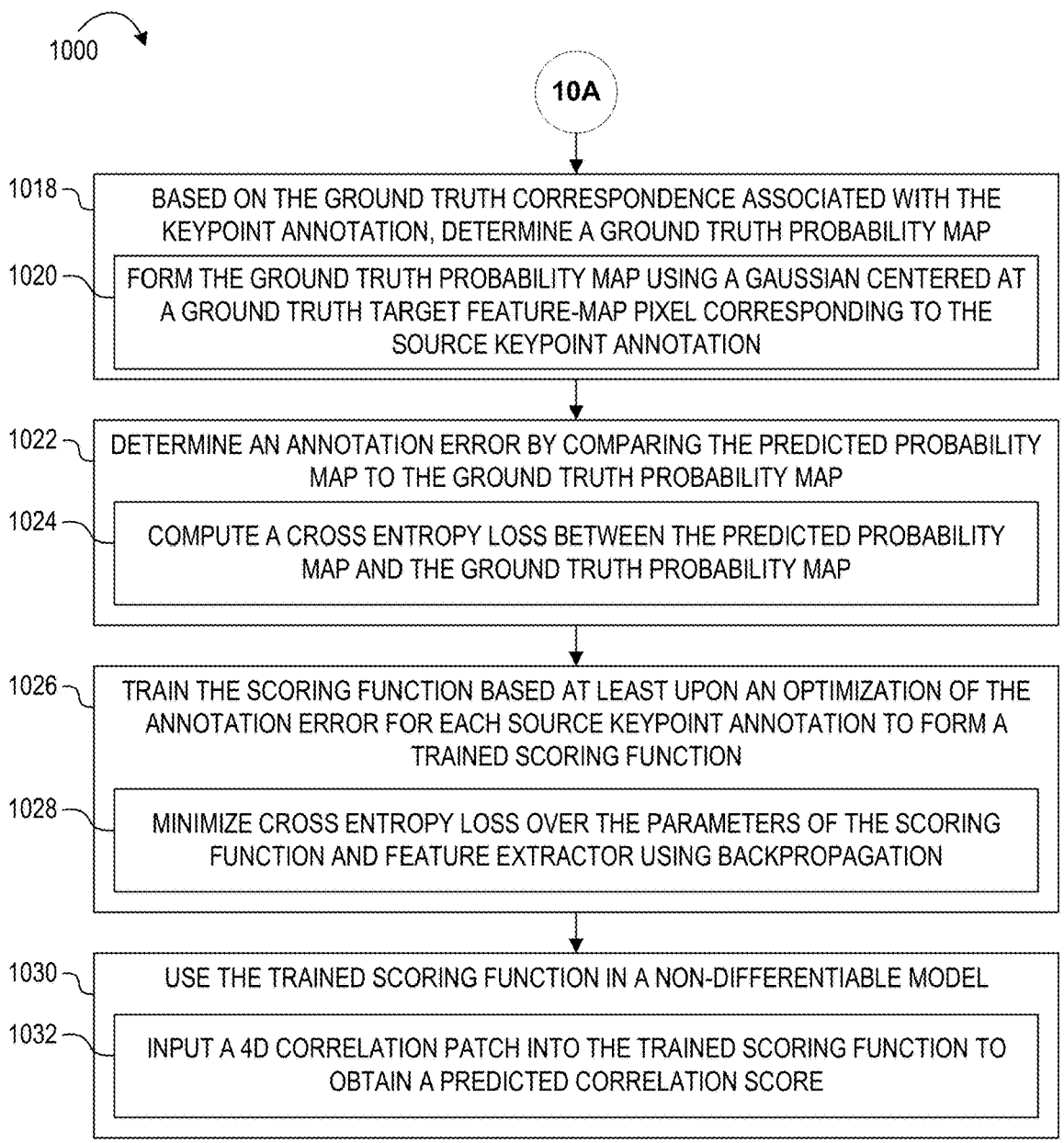

FIGS. 10A-10B show a flow diagram for an example method 1000 for training a scoring function and a feature extractor for use in a non-differentiable model. At 1002, the method comprises receiving an image pair comprising a source image and a target image, the image pair further comprising a plurality of keypoint annotations, each keypoint annotation comprising a ground truth correspondence that maps a feature map pixel of the source image to a feature map pixel of the target image. At 1004, the method comprises extracting, via the feature extractor, features from the source image to form a source feature map comprising source feature map pixels. At 1006, the method comprises extracting, via the feature extractor, features from the target image to form a target feature map comprising target feature map pixels. At 1008, the method comprises forming a correlation map comprising a plurality of similarity scores for a corresponding plurality of pairs of pixels. Each pair of pixels comprises a pixel of the source feature map and a pixel of the target feature map. In some example, the correlation map is formed via a dot product operation (e.g., dot product operation 316).

Method 100 further comprises, at 1010, for each keypoint annotation, obtaining a matching score for each candidate pixel of a plurality of candidate pixels by inputting a four-dimensional (4D) patch into a scoring function, the 4D patch comprising a mapping of a source feature map pixel associated with the keypoint annotation to the candidate pixel. At 1012, the method further comprises, based on the matching score for the plurality of candidate pixels, forming a two-dimensional (2D) matching score map. At 1014, the method comprises, based on the 2D matching score map, determining a predicted probability map by using a differentiable operation. In some examples, at 1016, the method uses a softmax operation for the differentiable operation.

Continuing to FIG. 10B, method 1000 further comprises, at 1018, based on the ground truth correspondence associated with the keypoint annotation, determining a ground truth probability map. In some examples, at 1020, the method forms the ground truth probability map using a Gaussian centered at a ground truth target feature map pixel corresponding to the source keypoint annotation.

At 1022, method 1000 comprises determining an annotation error by comparing the predicted probability map to the ground truth probability map. In some examples, at 1024, determining the annotation error comprises computing a cross entropy loss between the predicted probability map and the ground truth probability map. In other examples, any other suitable loss function may be used.

At 1026, method 1000 further comprises training the scoring function based at least upon an optimization of the annotation error for each source keypoint annotation to form a trained scoring function. In some examples, at 1028, training the scoring function comprises minimizing cross entropy loss over the parameters of the scoring function and feature extractor using backpropagation. For example, determining the annotation error may comprise computing a loss sum $\mathcal{L}$ as a cross entropy loss for each source keypoint annotation as $\mathcal{L} = \Sigma_{ij} H(P_{ij}, \hat{P}_{ij})$, wherein $P_{ij}$ comprises the ground truth probability map for source keypoint annotation (i,j), $\hat{P}_{ij}$ comprises the predicted probability map for keypoint annotation (i,j), and H(•) comprises a cross entropy loss function, and the method comprises training the scoring function based at least upon a minimization of $\mathcal{L}$. The terms "minimization", "minimize" and the like as used herein refer to an endpoint of a computational process, which may not correspond to a local or global minimum.

At 1030, method 1000 comprises using the trained scoring function in the non-differentiable model. In some examples, at 1032, method 1000 further comprises inputting a 4D correlation patch into the trained scoring function to obtain a predicted correlation score.

In some examples, the methods and processes described herein are implemented on a computing system of one or more computing devices. In particular, such methods and processes may be implemented as a computer-application program or service, an application-programming interface (API), a library, and/or other computer-program product.

Figure 11:
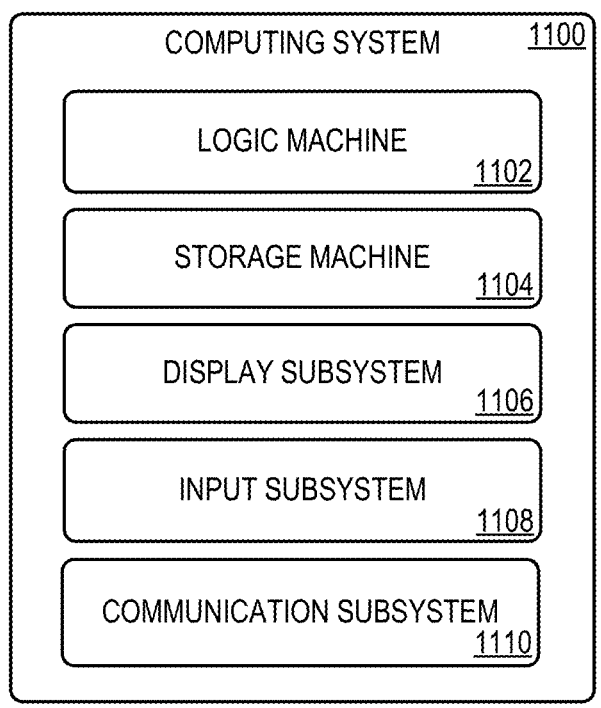
FIG. 11 shows a block diagram illustrating an example computing system.

FIG. 11 schematically shows a non-limiting embodiment of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), and/or other computing devices.

Computing system 1100 includes a logic machine 1102 and a storage machine 1104. Computing system 1100 may optionally include a display subsystem 1106, input subsystem 1108, communication subsystem 1110, and/or other components not shown in FIG. 11.

Logic machine 1102 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1104 includes one or more physical devices configured to hold instructions executable by the logic machine to implement the methods and processes described herein. When such methods and processes are implemented, the state of storage machine 1104 may be transformed—e.g., to hold different data.

Storage machine 1104 may include removable and/or built-in devices. Storage machine 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1104 may include volatile, nonvolatile, dynamic, static, read/write, read-only, random-access, sequential-access, location-addressable, file-addressable, and/or content-addressable devices.

It will be appreciated that storage machine 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1102 and storage machine 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1100 implemented to perform a particular function. For example, a module, program, or engine may be configured to implement methods 900 and/or 1000, or perform one or more functions of inference pipeline 200 and/or training pipeline 300. In some cases, a module, program, or engine may be instantiated via logic machine 1102 executing instructions held by storage machine 1104. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 1106 may be used to present a visual representation of data held by storage machine 1104. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic machine 1102 and/or storage machine 1104 in a shared enclosure, or such display devices may be peripheral display devices.

When included, input subsystem 1108 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1110 may be configured to communicatively couple computing system 1100 with one or more other computing devices. Communication subsystem 1110 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

Another example provides a computing system comprising a logic machine and a storage machine storing instructions executable by the logic machine to receive a source image and a target image, extract features from the source image to form a source feature map comprising source feature map pixels, extract features from the target image to form a target feature map comprising target feature map pixels, form a correlation map comprising a plurality of similarity scores for a corresponding plurality of pairs of pixels, each pair of pixels comprising a pixel of the source feature map and a pixel of the target feature map, and, based at least on the correlation map, form an initial correspondence map comprising initial mappings between pixels of the source feature map and corresponding pixels of the target feature map. The instructions are further executable to refine the initial correspondence map by, for each of one or more pixels of the source feature map, determining a plurality of candidate correspondences comprising the initial mapping and one or more other candidate mappings of the pixel of the source feature map to one or more other corresponding pixels of the target feature map, for each candidate correspondence, forming a patch comprising the pixel of the source feature map, one or more neighboring pixels of the source feature map, a corresponding pixel of the target feature map, and one or more neighboring pixels of the target feature map, inputting each patch into a trained scoring function, the trained scoring function being configured to output a correctness score, and selecting a refined correspondence based at least upon the correctness scores for the plurality of candidate correspondences; and output a refined correspondence map comprising a refined correspondence for each of the one or more pixels of the source feature map. In some examples, the instructions may be executable to extract features to form one or more of the source feature map and the target feature map using a convolutional neural network. Additionally or alternatively, the instructions may be executable to form the correlation map by computing each similarity score as an inner product between a feature vector corresponding to a pixel of the source feature map and a feature vector corresponding to a pixel of the target feature map. Additionally or alternatively, the instructions to form the initial correspondence map may comprise instructions to, for each pixel of the source feature map, map the pixel of the source feature map to a pixel of the target feature map based upon a greatest similarity score for the pixel of the source feature map. Additionally or alternatively, the instructions may be executable to form the patch by cropping the patch from the correlation map. Additionally or alternatively, each patch may be obtained according to $$A_{ijkl} = C_{i-\frac{r}{2}:i+\frac{r}{2}, j-\frac{r}{2}:j+\frac{r}{2}, k-\frac{r}{2}:k+\frac{r}{2}, l-\frac{r}{2}:l+\frac{r}{2}},$$

wherein $A_{ijkl}$ is a patch for pixel (i,j) of the source feature map and pixel (k,l) of the target feature map, C is the correlation map, and r is the number of pixels in each dimension of the patch. Additionally or alternatively, the instructions may be further executable to further refine the refined correspondence map by, for each of one or more pixels of the source feature map, determining a plurality of updated candidate correspondences comprising a mapping from the refined correspondence map and one or more other candidate mappings of the pixel of the source feature map to one or more other corresponding pixels of the target feature map, for each updated candidate correspondence, forming a patch, inputting each patch into the trained scoring function, and selecting an updated correspondence based at least upon the correctness scores for the plurality of candidate correspondences; and output a further refined correspondence map comprising an updated correspondence for each of the one or more pixels of the source feature map. Additionally or alternatively, the trained scoring function may comprise a neural network comprising one or more convolutions and one or more ReLU layers.

Another example provides a method of creating a refined correspondence map between a source image and a target image, the method comprising extracting features from the source image to form a source feature map, extracting features from the target image to form a target feature map, forming a correlation map comprising a plurality of similarity score for a corresponding plurality of pairs of pixels, each pair of pixels comprising a pixel of the source feature map and a pixel of the target feature map, based at least on the correlation map, forming an initial correspondence map comprising an initial mapping of pixels of the source feature map to pixels of the target feature map, refining the initial correspondence map by, for each of one or more pixels of the source feature map, determining a plurality of candidate correspondences comprising the initial mapping and one or more other candidate mappings of the pixel of the source feature map to one or more other corresponding pixels of the target feature map, for each candidate correspondence, forming a patch comprising the pixel of the source feature map, one or more neighboring pixels of the source feature map, a corresponding pixel of the target feature map, and one or more neighboring pixels of the target feature map, inputting each patch into a trained scoring function, the trained scoring function being configured to output a correctness score, and selecting a refined correspondence based at least upon the correctness scores for the plurality of candidate correspondences; and outputting the refined correspondence map comprising a refined correspondence for each of the one or more pixels of the source feature map. Additionally or alternatively, forming the correlation map may comprise computing each similarity score as an inner product between a feature vector corresponding to a pixel of the source feature map and a feature vector corresponding to a pixel of the target feature map. Additionally or alternatively, forming the initial correspondence map may comprise, for each pixel of the source feature map, mapping the pixel of the source feature map to a pixel of the target feature map based upon a greatest similarity score for the pixel of the source feature map. Additionally or alternatively, forming the patch may comprise cropping the patch from the correlation map according to $$A_{ijkl} = C_{i-\frac{r}{2}:i+\frac{r}{2}, j-\frac{r}{2}:j+\frac{r}{2}, k-\frac{r}{2}:k+\frac{r}{2}, l-\frac{r}{2}:l+\frac{r}{2}},$$

wherein $A_{ijkl}$ is a patch for pixel (i,j) of the source feature map and pixel (k,l) of the target feature map, C is the correlation map, and r is the number of pixels in each dimension of the patch. Additionally or alternatively, the method may further comprise refining the refined correspondence map by, for each of one or more pixels of the source feature map, determining a plurality of updated candidate correspondences comprising a mapping from the refined correspondence map and one or more other candidate mappings of the pixel of the source feature map to one or more other corresponding pixels of the target feature map, for each updated candidate correspondence, forming a patch, inputting each patch into the trained scoring function, and selecting an updated correspondence based at least upon the correctness scores for the plurality of candidate correspondences and outputting a further refined correspondence map comprising an updated correspondence for each of the one or more pixels of the source feature map.

Another example provides a computing system comprising a logic machine, and a storage machine storing instructions executable by the logic machine to train a scoring function and a feature extractor for use in a non-differentiable model by receiving an image pair comprising a source image and a target image, the image pair further comprising a plurality of keypoint annotations, each keypoint annotation comprising a ground truth correspondence that maps a feature map pixel of the source image to a feature map pixel of the target image, extracting, via the feature extractor, features from the source image to form a source feature map comprising source feature map pixels, extracting, via the feature extractor, features from the target image to form a target feature map comprising target feature map pixels, and forming a correlation map comprising a plurality of similarity scores for a corresponding plurality of pairs of pixels, each pair of pixels comprising a pixel of the source feature map and a pixel of the target feature map. The instructions are further executable to, for each keypoint annotation of the plurality of keypoint annotations, for each candidate pixel of a plurality of candidate pixels of the target feature map, obtain a matching score by inputting a patch into the scoring function, the patch comprising a mapping of a source feature map pixel associated with the keypoint annotation to the candidate pixel, based on the matching score for the plurality of candidate pixels, form a matching score map, based on the matching score map, determine a predicted probability map by using a differentiable operation, based on the ground truth correspondence associated with the keypoint annotation, determine a ground truth probability map, determine an annotation error by comparing the predicted probability map to the ground truth probability map, train the scoring function based at least upon an optimization of the annotation error for each source keypoint annotation to form a trained scoring function, and use the trained scoring function in the non-differentiable model. In some examples, the differentiable operation comprises a soft-max operation. Additionally or alternatively, the instructions may be executable to determine the annotation error by computing a loss sum $\mathcal{L}$ as a cross entropy loss for each source keypoint annotation $\mathcal{L} = \Sigma_i H(P_i, \hat{P}_i)$, wherein $P_i$ comprises the ground truth probability map for source keypoint annotation i, $\hat{P}_i$ comprises the predicted probability map for keypoint annotation i, and H(•) comprises a cross entropy loss function, and train the scoring function based at least upon a minimization of $\mathcal{L}$. Additionally or alternatively, the instructions executable to train the scoring function may comprise instructions executable to minimize $\mathcal{L}$ over the parameters of the scoring function and the feature extractor using backpropagation. Additionally or alternatively, the trained scoring function may comprise a neural network comprising one or more convolutions and one or more ReLU layers. Additionally or alternatively, the ground truth probability map may comprise a Gaussian distribution centered at a ground truth target feature map pixel corresponding to the keypoint annotation. Additionally or alternatively, the instructions may be further executable to input a correlation patch into the trained scoring function to obtain a predicted correlation score.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing system comprising:
a logic machine; and
a storage machine storing instructions executable by the logic machine to train a scoring function and a feature extractor for use in a non-differentiable model by:
  receiving an image pair comprising a source image and a target image, the image pair further comprising a plurality of keypoint annotations, each keypoint annotation comprising a ground truth correspondence that maps a feature map pixel of the source image to a feature map pixel of the target image,
  extracting, via the feature extractor, features from the source image to form a source feature map comprising source feature map pixels,
  extracting, via the feature extractor, features from the target image to form a target feature map comprising target feature map pixels;
  forming a correlation map comprising a plurality of similarity scores for a corresponding plurality of pairs of pixels, each pair of pixels comprising a pixel of the source feature map and a pixel of the target feature map,
  for each keypoint annotation of the plurality of keypoint annotations:
    for each candidate pixel of a plurality of candidate pixels of the target feature map, obtain a matching score by inputting a patch into the scoring function, the patch comprising a mapping of a source feature map pixel associated with the keypoint annotation to the candidate pixel,
    based on the matching score for the plurality of candidate pixels, form a matching score map,
    based on the matching score map, determine a predicted probability map by using a differentiable operation,
    based on the ground truth correspondence associated with the keypoint annotation, determine a ground truth probability map,
    determine an annotation error by comparing the predicted probability map to the ground truth probability map,
    train the scoring function based at least upon an optimization of the annotation error for each source keypoint annotation to form a trained scoring function, and
  use the trained scoring function in the non-differentiable model.

2. The computing system of claim 1, wherein the differentiable operation comprises a soft-max operation.

3. The computing system of claim 1, wherein the instructions are executable to determine the annotation error by computing a loss sum $\mathcal{L}$ as a cross entropy loss for each source keypoint annotation:

$$\mathcal{L} = \sum_i H(P_i, \hat{P}_i)$$

wherein $P_i$ comprises the ground truth probability map for source keypoint annotation i, $\hat{P}_i$ comprises the predicted probability map for keypoint annotation i, and H(•) comprises a cross entropy loss function, and train the scoring function based at least upon a minimization of $\mathcal{L}$.

4. The computing system of claim 3, wherein the instructions executable to train the scoring function comprise instructions executable to minimize $\mathcal{L}$ over the parameters of the scoring function and the feature extractor using backpropagation.

5. The computing system of claim 1, wherein the trained scoring function comprises a neural network comprising one or more convolutions and one or more ReLU layers.

6. The computing system of claim 1, wherein the ground truth probability map comprises a Gaussian distribution centered at a ground truth target feature map pixel corresponding to the keypoint annotation.

7. The computing system of claim 1, wherein the instructions are further executable to input a correlation patch into the trained scoring function to obtain a predicted correlation score.

* * * * *